United States Patent
Ogawa

(10) Patent No.: US 11,366,356 B2
(45) Date of Patent: Jun. 21, 2022

(54) SURFACE LIGHT SOURCE DEVICE AND DISPLAY DEVICE

(71) Applicant: Funai Electric Co., Ltd., Osaka (JP)

(72) Inventor: Akihisa Ogawa, Osaka (JP)

(73) Assignee: FUNAI ELECTRIC CO., LTD., Osaka (JP)

( * ) Notice: Subject to any disclaimer, the term of this patent is extended or adjusted under 35 U.S.C. 154(b) by 0 days.

(21) Appl. No.: 17/320,686

(22) Filed: May 14, 2021

(65) Prior Publication Data

US 2021/0364857 A1 Nov. 25, 2021

(30) Foreign Application Priority Data

May 25, 2020 (JP) .............................. JP2020-090509

(51) Int. Cl.
*G02F 1/13357* (2006.01)

(52) U.S. Cl.
CPC .. *G02F 1/133605* (2013.01); *G02F 1/133603* (2013.01)

(58) Field of Classification Search
CPC ......... G02F 1/133603; G02F 1/133605; G02F 2201/465; G02F 2201/54; G02F 2202/28
See application file for complete search history.

(56) References Cited

U.S. PATENT DOCUMENTS

| 2017/0016584 A1 | 1/2017 | Snijkers |
| 2018/0372300 A1 | 12/2018 | Ohkawa |
| 2019/0094618 A1 | 3/2019 | Kyoukane et al. |

FOREIGN PATENT DOCUMENTS

| EP | 2157474 A1 * | 2/2010 | ....... G02F 1/133608 |
| JP | 2019-61929 A | 4/2019 | |

OTHER PUBLICATIONS

The extended European search report for the corresponding European application No. 21174290.3 dated Sep. 29, 2021.

* cited by examiner

*Primary Examiner* — Britt D Hanley
(74) *Attorney, Agent, or Firm* — Global IP Counselors, LLP

(57) ABSTRACT

A surface light source device comprises: a plurality of light sources configured to emit light toward a light exit surface of the surface light source device; a holding member having an installation surface on which the light sources are installed; and a reflector having a plurality of openings that expose the light sources, respectively, the reflector being arranged to cover the installation surface of the holding member, the reflector including a first reflective sheet having an engagement piece at a peripheral portion of the first reflective sheet and a second reflective sheet adjacent to the first reflective sheet and having an engaged portion that is shiftably engaged with the engagement piece.

20 Claims, 9 Drawing Sheets

(FIRST EMBODIMENT)

(COMPARATIVE EXAMPLE)

ENLARGED CROSS-SECTION AROUND AREA 907

(FOURTH EMBODIMENT)

SURFACE LIGHT SOURCE DEVICE AND DISPLAY DEVICE

CROSS-REFERENCE TO RELATED APPLICATIONS

This application claims priority to Japanese Patent Application No. 2020-090509 filed on May 25, 2020. The entire disclosure of Japanese Patent Application No. 2020-090509 is hereby incorporated herein by reference.

BACKGROUND

Field of the Invention

This invention generally relates to a surface light source device and a display device. More specifically, the present invention relates to a surface light source device and a display device having a reflective sheet.

Background Information

Generally, a surface light source device and a display device are equipped with a reflective sheet (see Japanese Patent Application Publication No. 2019-61929 (Patent Literature 1), for example).

Patent Literature 1 above discloses a backlight device equipped with a plurality of LEDs (light emitting diodes), an LED substrate on which the LEDs are provided in a matrix, and a reflective sheet provided on the LED substrate. The reflective sheet has a plurality of openings that open up at the LEDs, respectively. The reflective sheet is attached to the LED substrate by double-sided adhesive sheets at a plurality of locations.

SUMMARY

In a surface light source device, such as the one in Patent Literature 1 above, expansion and contraction occur in the reflective sheet due to temperature changes. Since the reflective sheet is adhered by double-sided adhesive sheets in a plurality of locations, when the reflective sheet expands thermally, for example, an area of the reflective sheet between two adjacent double-sided adhesive sheets is pushed back from both sides due to the stretching (expansion) of the reflective sheet, which results in wrinkles in the reflective sheet. The occurrence of wrinkles in the reflective sheet causes non-uniformity in the luminance distribution of the surface light source device.

In Patent Literature 1 above, the reflective sheet is divided into a plurality of parts and installed on the LED substrate such that adjacent end portions of the divided parts overlap each other. In this case, if adhering or other methods are used to suppress the lifting or turning up of the overlapping portions, the stretching (expansion) of the divided parts of the reflective sheet causes winkles in the reflective sheet when adjacent parts of the reflective sheet thermally expand with each other.

One object of the present disclosure is to provide a surface light source device and a display device that can suppress winkles in a reflective sheet caused by thermal expansion of the reflective sheet due to temperature changes.

In view of the state of the known technology and in accordance with a first aspect of the present invention, a surface light source device comprises a plurality of light sources configured to emit light toward a light exit surface of the surface light source device; a holding member having an installation surface on which the light sources are installed; and a reflector having a plurality of openings that expose the light sources, respectively, the reflector being arranged to cover the installation surface of the holding member, the reflector including a first reflective sheet having an engagement piece at a peripheral portion of the first reflective sheet and a second reflective sheet adjacent to the first reflective sheet and having an engaged portion that is shiftably engaged with the engagement piece.

BRIEF DESCRIPTION OF THE DRAWINGS

Referring now to the attached drawings which form a part of this original disclosure.

DETAILED DESCRIPTION OF EMBODIMENTS

Figure 1:
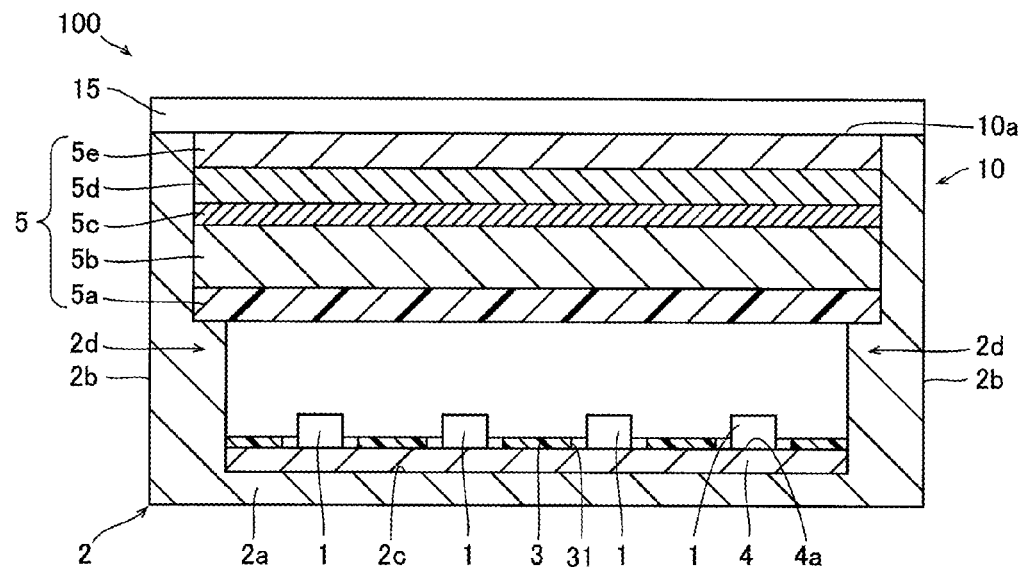
FIG. 1 is a schematic cross-sectional view illustrating an overall configuration of a liquid crystal display device according to a first embodiment.

Selected embodiments will now be explained with reference to the drawings. It will be apparent to those skilled in the display device field from this disclosure that the following descriptions of the embodiments are provided for illustration only and not for the purpose of limiting the invention as defined by the appended claims and their equivalents. Like reference numerals in the drawings denote like similar or identical elements or features, and thus the descriptions of the similar or identical elements or features may be omitted in later embodiments.

First Embodiment (Configuration of Backlight Unit and Liquid Crystal Display Device)

Referring to FIGS. 1 to 6, the configuration of a backlight unit 10 and a liquid crystal display device 100 according to a first embodiment will be described. The backlight unit 10 and the liquid crystal display device 100 are examples of the "surface light source device" and the "display device" of the present disclosure, respectively.

As shown in FIG. 1, the liquid crystal display device 100 is equipped with a display 15 and a backlight unit 10. The backlight unit 10 is equipped with a plurality of LEDs (light emitting diodes) 1, a holding member 2, and a reflector or reflective sheet assembly having a plurality of reflective sheets 3. The LEDs 1 are an example of a "light source" of the present disclosure.

The backlight unit 10 emits light from the LEDs 1 from a light exit surface 10a. The backlight unit 10 has a structure to homogenize the intensity distribution of the light emitted from the light exit surface 10a. The light exit surface 10a is a surface of the backlight unit 10 disposed on the opposite side relative to an installation surface 2c of the Holding Member 2 on which the LEDs 1 are Installed. The Display 15 is Disposed on the light exit surface 10a of the backlight unit 10 so as to face the reflective sheets 3.

The display 15 is formed of a liquid crystal display panel with a plurality of pixels. The display 15 includes a polarizing plate and a liquid crystal cell. The display 15 displays images (pictures) using the light from the backlight unit 10 by changing the light transmittance in each of the pixels. The display 15 is driven based on control signals from a control unit, which is not shown in the drawings.

Next, the configuration of the backlight unit 10 will be explained.

Figure 2:
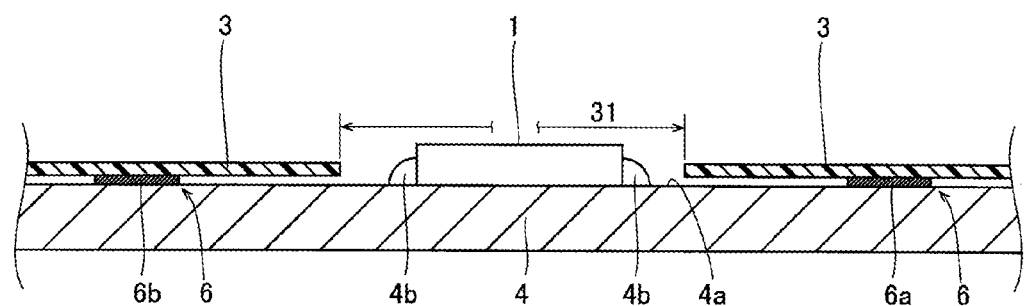
FIG. 2 is an enlarged cross-sectional view of the liquid crystal display device, illustrating an LED in an opening of a reflective sheet.
Figure 3:
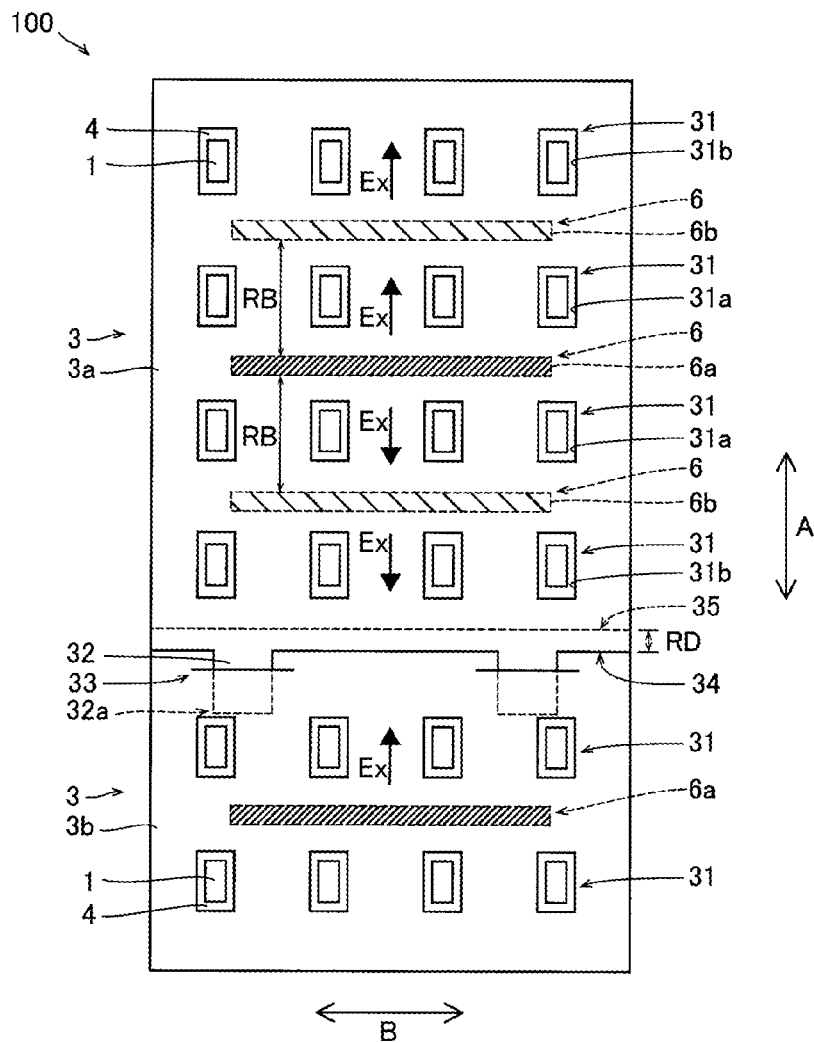
FIG. 3 is a plan view of a reflective sheet assembly according to the first embodiment, illustrating a plurality of LEDs exposed through openings of the reflective sheet assembly.

The LEDs 1 emit the light toward the light exit surface 10a. The LEDs 1 are provided in such that they are distributed at intervals from each other on the installation surface 2c of the holding member 2. Specifically, the LEDs 1 are mounted on a substrate 4 that is attached to the installation surface 2c. The substrate 4 is a circuit board on which circuit patterns (not shown) for emitting the LEDs 1 are formed. As shown in FIG. 2, the LEDs 1 are fixed to a surface 4a of the substrate 4 by solder parts 4b and are electrically connected to the circuit patterns through the solder parts 4b. The LEDs 1 are formed of a package in which a chip and a phosphor are enclosed. The LEDs 1 emit white light. The LEDs 1 are arranged in a matrix (see FIG. 3), for example. In the illustrated embodiment, as shown in FIG. 3, twenty-four (24) LEDs are arranged in a matrix, for example, but the number of the LEDs can be more than or less than twenty-four, as needed and/or desired.

In the example of FIG. 1, the holding member 2 has a rectangular shape (a box shape) with an opening section in an upper part. An optical sheet assembly 5 is provided in the opening section. Specifically, the opening section of the holding member 2 is covered by the optical sheet assembly 5, and an outermost surface of the optical sheet assembly 5 forms the light exit surface 10a of the backlight unit 10. The holding member 2 has a bottom portion 2a and a side portion 2b that rises from a peripheral edge of the bottom portion 2a. The installation surface 2c on which the LEDs 1 are installed is an inner surface of the bottom portion 2a (i.e., an inner bottom surface of the holding member 2). The side portion 2b entirely surrounds the peripheral edge of the bottom section 2a.

The reflective sheets 3 are provided to cover the installation surface 2c of the holding member 2. In other words, the reflective sheets 3 cover the surface 4a of the substrate 4 that is provided on the installation surface 2c. In the first embodiment, the reflective sheets 3 (see FIG. 3) are positioned to dividedly cover the installation surface 2c of the holding member 2. In other words, the reflective sheets 3 each at least partially cover the installation surface 2c of the holding member 2. Each of the reflective sheets 3 has a plurality of openings 31 that expose the LEDs 1, respectively, above the installation surface 2c of the holding member 2. In other words, the reflective sheets 3 are provided to cover the surface 4a of the substrate 4 other than the LEDs 1, while exposing the LEDs 1 and their neighboring areas toward the light exit surface 10a through the openings 31, respectively.

Figure 4:
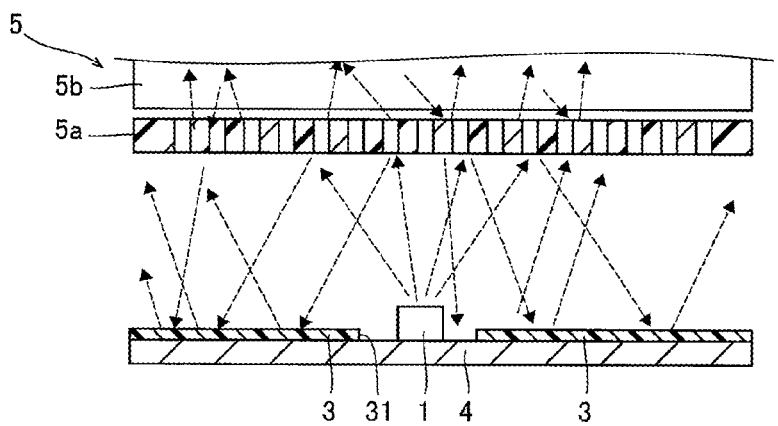
FIG. 4 is a schematic enlarged cross-sectional view of the liquid crystal display device, illustrating reflection of light between the reflective sheet and an optical sheet assembly.

As shown in FIG. 1, the reflective sheets 3 are provided on the installation surface 2c of the holding member 2 to face the optical sheet assembly 5 at a distance. As a result, a space located between the optical sheet assembly 5 and the reflective sheets 3 and surrounded by the side portion 2b of the holding member 2 is formed inside the holding member 2. As shown in FIG. 4, the reflective sheets 3 have a function of reflecting light in this space toward the light exit surface 10a (toward the optical sheet assembly 5) to homogenize the intensity distribution of the light and improve the light utilization efficiency. The reflective sheets 3 are made of a micro-cellular foam resin, for example. The reflective sheets 3 is made of, for example, micro-cellular polyethylene terephthalate. The reflectivity of the reflective sheets 3 is greater than the reflectivity of the surface 4a of the substrate 4 and the reflectivity of the solder parts 4b.

As shown in FIG. 1, the backlight unit 10 includes the optical sheet assembly 5. The holding member 2 has a stepped portion 2d protruding inward from the side portion 2b. An outer peripheral portion of the optical sheet assembly 5 is supported by this stepped portion 2d.

The optical sheet assembly 5 includes a plurality of optical sheets with different functions (optical characteristics). For example, in the example shown in FIG. 1, the optical sheet assembly 5 includes a light homogenizing sheet 5a, a diffuser plate 5b, a prism sheet 5c, a reflective polarizing film 5d, and a louver sheet 5e. The light homogenizing sheet 5a, the diffuser plate 5b, the prism sheet 5c, the reflective polarizing film 5d, and the louver sheet 5e are laminated in this order from the installation surface 2c side to the light exit surface 10a side.

The light homogenizing sheet 5a includes a transmission part that transmits the light emitted from the LEDs 1 and a reflection part that reflects the light emitted from the LEDs 1. The light homogenizing sheet 5a has a function of homogenizing luminance by transmitting a part of the light and reflecting the other part of the light. The reflection part is formed by a sheet surface of the light homogenizing sheet 5a that reflects the light. The transmission part is formed of, for example, a plurality of through holes formed in the light homogenizing sheet 5a. A large number of transmission parts are formed throughout the light homogenizing sheet 5a so that the luminance distribution of the transmitted light is homogenized.

The diffuser plate 5b scatters the light transmitted through the transmission part of the light homogenizing sheet 5a. The diffuser plate 5b is made of a resin such as polycarbonate. The prism sheet 5c has a function of refracting the light scattered by the diffuser plate 5b in a predetermined direction and focusing it on the light exit surface 10a side.

The reflective polarizing film 5d reflects light having a polarization direction that is absorbed in the display 15, and transmits light having a polarization direction that is not absorbed. By allowing the reflected light to re-enter via the reflective sheets 3, it is possible to improve the efficiency of light utilization. The louver sheet 5e has a function of blocking the light incident at an angle relative to the louver sheet 5e out of the light transmitted through the reflective polarizing film 5d.

The optical sheet assembly 5 may have only a part of the optical films described above, or may further have optical films with other functions other than the optical films described above.

With this configuration, a part of the light emitted from the LEDs 1 passes through the optical sheet assembly 5 and exits from the light exit surface 10a toward the display 15. The other part of the light emitted from the LEDs 1 is reflected by the light homogenizing sheet 5a, the reflective polarizing film 5d and the like, and returns toward the installation surface 2c, as shown in FIG. 4. The returned light is reflected again by the reflective sheets 3 toward the light exit surface 10a. As a result, the luminance distribution emitted from the light exit surface 10a is homogenized due to the multiple reflection of light between the reflective sheets 3 and the optical sheet assembly 5.

(Configuration of Reflective Sheets)

Next, the configuration of the reflective sheets 3 will be explained. As shown in FIG. 3, the backlight unit 10 (the liquid crystal display device 100) is equipped with the reflective sheets 3 positioned to dividedly cover the installation surface 2c of the holding member 2.

In the first embodiment, as shown in FIG. 3, the reflective sheets 3 include a first reflective sheet 3a having a plurality of (two) engagement pieces 32 at a peripheral portion of the first reflective sheet 3a, and a second reflective sheet 3b adjacent to the first reflective sheet 3a and having a plurality of (two) engaged portions 33 that are shiftably engaged with the engagement pieces 32. The first reflective sheet 3a is integrally formed as a single, unitary member. The second reflective sheet 3b is also integrally formed as a single, unitary member. Thus, in the first embodiment, the reflector or reflective sheet assembly is formed by the first reflective sheet 3a and the second reflective sheet 3b that are independently formed as separate members. FIG. 3 shows an example of a simple configuration in which the reflective sheets 3 include one first reflective sheet 3a and one second reflective sheet 3b. The installation surface 2c is substantially entirely covered by the one first reflective sheet 3a and the one second reflective sheet 3b. The reflective sheets 3 forms the reflector or reflective sheet assembly (sub-assembly) in which the first reflective sheet 3a and the second reflective sheet 3b are assembled together as a unit so as to engage with each other. In the illustrated embodiment, the reflector or reflective sheet assembly is formed by the one first reflective sheet 3a and the one second reflective sheet 3b. However, the numbers of the first reflective sheet 3a and the second reflective sheet 3b are not limited to this. Both or one of the first reflective sheet 3a and the second reflective sheet 3b may be provided in multiple number. For example, one first reflective sheet 3a (or one second reflective sheet 3b) may be assembled and engaged with a plurality of second reflective sheets 3b (or a plurality of first reflective sheets 3a) to form the reflector or reflective sheet assembly.

Figure 5:
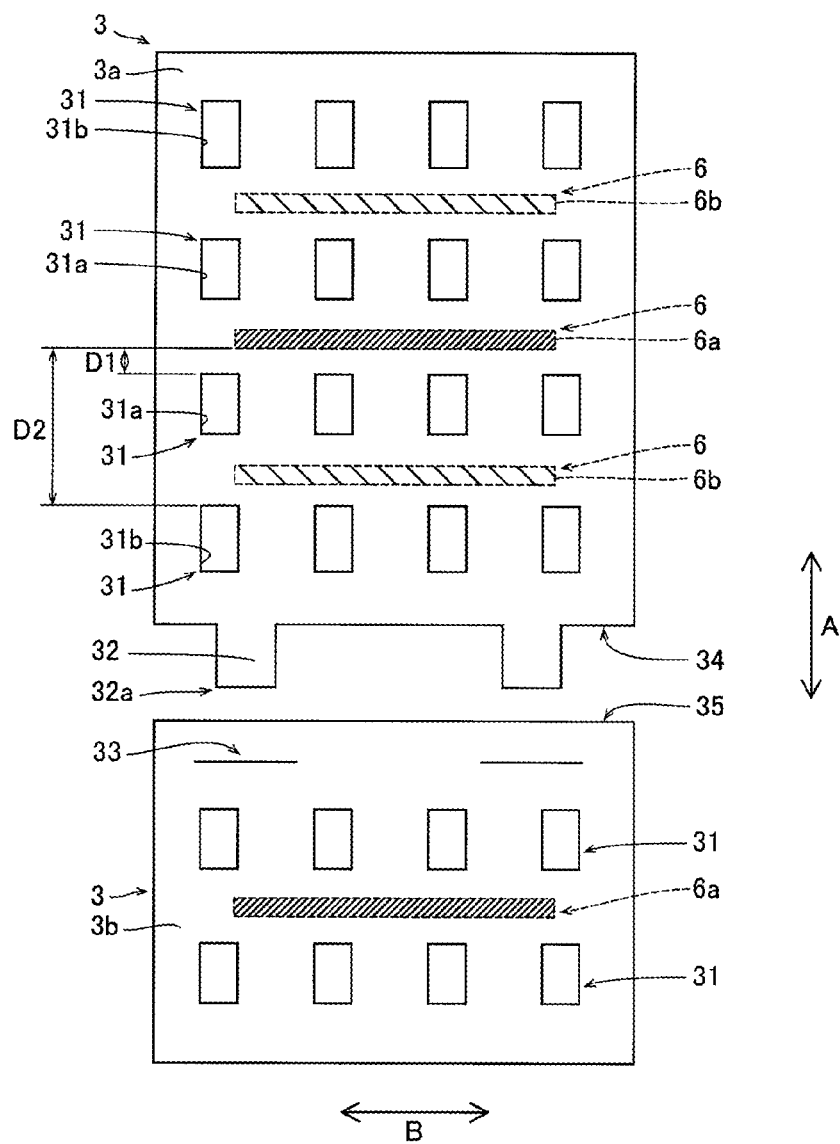
FIG. 5 is an exploded plan view of the reflective sheet assembly, illustrating a plurality of reflective sheets separated from each other.
Figure 6A:
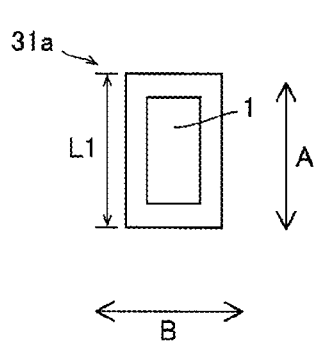
FIG. 6A is an enlarged view of a first opening of the reflective sheet.
Figure 6B:
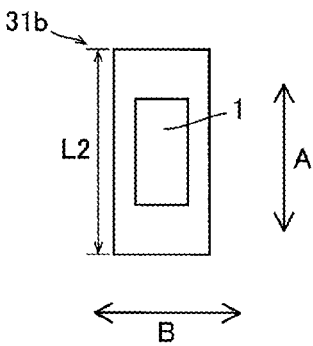
FIG. 6B is an enlarged view of a second opening of the reflective sheet.

As shown in FIG. 5, the first reflective sheet 3a and the second reflective sheet 3b are each rectangular in shape with four edges. In the example in FIG. 5, the first reflective sheet 3a is larger than the second reflective sheet 3b, but the first reflective sheet 3a and the second reflective sheet 3b can be the same size, or the second reflective sheet 3b can be larger than the first reflective sheet 3a.

The first reflective sheet 3a has the engagement pieces 32 on an edge 34 on the second reflective sheet 3b side. The engagement pieces 32 are formed so as to protrude outward from the peripheral portion of the first reflective sheet 3a. The engagement pieces 32 are integrally formed with the first reflective sheet 3a. In other words, the first reflective sheet 3a is cut out from a single, unitary sheet in a shape that includes the engagement pieces 32. In the illustrated embodiment, the first reflective sheet 3a has two engagement pieces 32, but the number of engagement pieces 32 can be one or more than two. In the example of FIG. 5, the first reflective sheet 3a has a plurality (two) of the engagement pieces 32 at an interval on the edge 34 on the second reflective sheet 3b side. In the example in FIG. 5, the engagement pieces 32 each have a rectangular shape.

The second reflective sheet 3b has the engaged portions 33 near an edge 35 on the first reflective sheet 3a side. The engaged portions 33 include slits that are formed in the second reflective sheet 3b and into which the engagement pieces 32 are inserted, respectively. In other words, in the example of FIG. 5, the engaged portions 33 are straight slits or through holes that penetrate the second reflective sheet 3b in a thickness direction. The engaged portions 33 are provided in the same number (two) as the number of the engagement pieces 32 so that they correspond one-to-one with the plurality (two) of the engagement pieces 32. Thus, the number of the engaged portions 33 can be one or more than two corresponding to the number of the engagement pieces 32. As shown in FIG. 3, the first reflective sheet 3a and the second reflective sheet 3b are engaged by inserting the engagement pieces 32 of the first reflective sheet 3a into the engaged portions 33 of the second reflective sheet 3b. The first reflective sheet 3a and the second reflective sheet 3b are shiftable with respect to each other in a direction of insertion of the engagement pieces 32 and in the opposite direction (an insertion/extraction direction) while maintaining the engaged state. In other words, the first reflective sheet 3a and the second reflective sheet 3b are shiftably or movably engaged with each other, and thus are not fixedly and immovably coupled relative to each other. In particular, the first reflective sheet 3a and the second reflective sheet 3b are shiftably or movably engaged with each other with friction force between the engagement pieces 32 and the engaged portions 33 to form the reflector or reflective sheet assembly that can be handled as a unit.

The engaged portions 33 are located at a position inside a peripheral portion of the second reflective sheet 3b such that the peripheral portion of the first reflective sheet 3a overlaps the peripheral portion of the second reflective sheet 3b when the engaged portions 33 are engaged with the engagement pieces 32. In other words, the engaged portions 33 are spaced apart by a predetermined distance from the edge 35 of the second reflective sheet 3b. As a result, the first reflective sheet 3a and the second reflective sheet 3b overlap each other in an area RD between the edge 34 of the first reflective sheet 3a and the edge 35 of the second reflective sheet 3b to form a boundary portion between the first reflective sheet 3a and the second reflective sheet 3b.

In the example of FIG. 3, the engagement pieces 32 are inserted into the engaged portions 33 from an upper surface side of the second reflective sheet 3b, and the first reflective sheet 3a overlaps an upper surface of the second reflective sheet 3b. Conversely, the engagement pieces 32 may be inserted into the engaged portions 33 from an under surface side of the second reflective sheet 3b, and the first reflective sheet 3a may overlap an under surface of the second reflective sheet 3b.

The first reflective sheet 3a and the second reflective sheet 3b are positioned and shiftably coupled relative to each other in a state in which the engagement pieces 32 are inserted into the engaged portions 33 up to a position between a distal end portion 32a and a base portion (i.e., a connection to the edge 34) of each of the engagement pieces 32, as shown in FIG. 3. The insertion length of the engagement pieces 32 can be about half of the total length of the engagement pieces 32 from the base portion (the edge 34) to the distal end portion 32a. Therefore, even when the first reflective sheet 3a and the second reflective sheet 3b are positionally shifted relative to each other in a direction in which the engagement pieces 32 and the engaged portions 33 approach relative to each other (see arrows Ex on the first reflective sheet 3a directing toward the second reflective sheet 3b and an arrow Ex on the second reflective sheet 3b directing toward the first reflective sheet 3a) due to expansion caused by temperature rise, the positional shift can be absorbed while maintaining the engaged state of the engagement pieces 32 and the engaged portions 33 by increasing the insertion length of the engagement pieces 32. On the other hand, even when the first reflective sheet 3a and the second reflective sheet 3b are positionally shifted relative to each other in a direction in which the engagement pieces 32 and the engaged portions 33 are separated from each other due to contraction caused by temperature drop, the positional shift can be absorbed while maintaining the engaged state of the engagement pieces 32 and the engaged portions 33 by reducing the insertion length of the engagement pieces 32.

Here, the reflective sheets 3 are each made of a resin sheet with a relatively large amount of thermal expansion in a first direction A (e.g., a first in-plane direction) within the sheet surface and a relatively small amount of thermal expansion in a second direction B (a second in-plane direction) orthogonal to the first direction A within the sheet surface. The first direction A is a machine flow direction during the manufacture of the resin sheet, and is the so-called MD direction. The second direction B is a width direction orthogonal to the MD direction within a surface of the resin sheet, and is the so-called TD direction. In this case, the expansion and contraction that occurs when the first reflective sheet 3a and the second reflective sheet 3b are exposed to temperature changes occurs mainly along the first direction A.

The first reflective sheet 3a and the second reflective sheet 3b are provided such that their respective first directions A coincide with each other, and coincide with a direction along which they are adjacent to each other (along which they are arranged with respect to each other). For this purpose, the engagement pieces 32 are formed on the peripheral portion of the first reflective sheet 3a in the first direction A, and the engaged portions 33 of the second reflective sheet 3b are formed to shiftably engage with the engagement pieces 32 in the first direction A. The edge 34 on which the engagement pieces 32 are formed is an end of the first reflective sheet 3a in the first direction A, and is an edge that extends along the second direction B. Similarly, the edge 35 of the second reflective sheet 3b is an end of the second reflective sheet 3b in the first direction A, and is an edge that extends along the second direction B.

(Adhesive Members)

The reflective sheets 3 are adhered or bonded to predetermined positions on the holding member 2 by adhesive members 6, respectively. Specifically, as shown in FIG. 2, the adhesive members 6 are provided to adhere or bond the reflective sheets 3 to the surface 4a of the substrate 4, respectively. The substrate 4 is fixedly attached to the installation surface 2c of the holding member 2 by another adhesive member not shown in the drawings, or a fastening member such as a screw.

As shown in FIG. 3, in the first embodiment, the reflector or reflective sheet assembly is fixedly attached to a predetermined position of the holding member 2 by at least one (two in FIG. 3) first adhesive member 6a and at least one (two in FIG. 3) second adhesive member 6b. In particular, in the first embodiment, at least one of the reflective sheets 3 of the reflector or reflective sheet assembly is fixedly attached to a predetermined position of the holding member 2 by at least one first adhesive member 6a and at least one second adhesive member 6a. In the first embodiment, the first adhesive member 6a is an adhesive member or material that adheres the reflective sheet 3 immovably in a direction along the installation surface 2c, while the second adhesive member 6a is an adhesive member or material that is disposed between the first adhesive member 6a and the peripheral portion of the reflective sheet 3 and adheres the reflective sheet 3 shiftably in the direction along the installation surface 2c. In FIGS. 3 and 5, the first adhesive member 6a and the second adhesive member 6b are shown with different hatching for convenience.

As shown in FIG. 3, in the first embodiment, one first adhesive member 6a and two second adhesive members 6b are provided for the first reflective sheet 3a, which is a larger one of the first reflective sheet 3a and the second reflective sheet 3b. Furthermore, one first adhesive member 6a is provided for the second reflective sheet 3b, which is a smaller one of the first reflective sheet 3a and the second reflective sheet 3b, but no second adhesive member 6b is provided for the second reflective sheet 3b in the first embodiment. However, the second reflective sheet 3b may be further provided with a second adhesive member 6b, as needed and/or desired. In particular, the second reflective sheet 3b can be fixedly attached relative to the holding member 2 by one first adhesive member 6a and two second reflective sheets 6b in a manner similar to the first reflective sheet 3a shown in FIG. 3.

The first adhesive member 6a is provided at one location within the surface of each of the reflective sheets 3 (the first reflective sheet 3a and the second reflective sheet 3b). The first adhesive members 6a are configured to position the reflective sheets 3 (the first reflective sheet 3a and second reflective sheet 3b) at predetermined positions in the holding member 2 and to maintain the positions by adhering the reflective sheets 3 (the first reflective sheet 3a and the second reflective sheet 3b) immovably relative to the holding member 2 (the substrate 4). Therefore, when thermal expansion or contraction occurs in the reflective sheets 3 (the first reflective sheet 3a and second reflective sheet 3b), each portion of the reflective sheets 3 expands thermally in a direction away from the first adhesive members 6a and contracts thermally in a direction approaching the first adhesive members 6a. The arrows Ex in FIG. 3 indicate the direction of thermal expansion occurring in the reflective sheets 3.

The second adhesive members 6b are provided at a plurality of locations on the peripheral portion side of the reflective sheet 3 (the first reflective sheet 3a) relative to the first adhesive member 6a. In the illustrated embodiment, the second adhesive members 6b are disposed spaced apart from the first adhesive member 6a to sandwich the first adhesive member 6a therebetween in the first direction A. The second adhesive members 6b are configured to, by adhering the reflective sheet 3 (the first reflective sheet 3a) shiftably relative to the holding member 2 (the substrate 4) in a direction along the installation surface 2c, allow the positional shift of the reflective sheet 3 (the first reflective sheet 3a) at the adhering locations by the second adhesive members 6b when thermal expansion or contraction occurs in the reflective sheet 3 (the first reflective sheet 3a), and prevent the peripheral portion of the reflective sheet 3 (the first reflective sheet 3a) from turning up, lifting, and warping.

More specifically, the first adhesive member 6a is provided at the center side of the first reflective sheet 3a in the first direction A, and the second adhesive members 6b are provided spaced apart from the first adhesive member 6a in the first direction A. The first adhesive member 6a and the second adhesive members 6b are each provided to extend linearly along the second direction B, and are arranged spaced apart along the first direction A.

By having the first adhesive member 6a and the second adhesive members 6b extend linearly along the second direction B, in which expansion and contraction are less likely to occur, a direction of expansion and contraction of the first reflective sheet 3a is substantially limited to the first direction A. Furthermore, since the first adhesive member 6a and the second adhesive members 6b are arranged spaced apart along the first direction A, when thermal expansion of the first reflective sheet 3a occurs at the center along the first direction A (see the arrows Ex), the second adhesive members 6b will follow the positional shift (thermal expansion) of the first reflective sheet 3a outward along the first direction A (directions of the arrows EX) while maintaining the adhered state with the first reflective sheet 3a.

In the first embodiment, the adhesive members 6 (the first adhesive members 6a and second adhesive members 6b) have different adhesive characteristics from each other, and can be made of at least one of adhesive tape or glue. Furthermore, the second adhesive members 6b are made of a material that has lower adhesive strength or is more easily deformed than the first adhesive members 6a. Here, the adhesive tape (or double-sided tape) is made by coating surfaces of a base film with glue (adhesive). The glue is a liquid during at least part of an adhering process, and then cures to adhere. In one example, the second adhesive members 6b are made of glue and is more deformable (flexible) than the first adhesive members 6a in the cured state. In another example, the second adhesive members 6b are made of adhesive tape, and have a lower adhesive strength than the first adhesive members 6a. For the second adhesive members 6b, an adhesive tape that is more easily deformed than the first adhesive member 6a, especially in the shear direction (a direction along the installation surface 2c), is selected. For the first adhesive members 6a, an adhesive tape or glue that does not deform (hard) is selected.

(Opening Shape)

Next, the shape (size) of the openings 31 will be explained. As shown in FIG. 2, the openings 31 are formed larger than the outer shape of the LEDs 1 and expose the LEDs 1 therethrough. The size of the openings 31 is designed so that the LEDs 1 are not pressed or covered by the reflective sheets 3 even when the reflective sheets 3 are displaced by the expansion and contraction, by taking into account variations in installation positions of the reflective sheets 3, variations in mounting positions of the LEDs 1, variations in an attachment position of the substrate 4 and displacement of the reflective sheet 3 due to expansion and contraction, and the like. In addition to the LEDs 1, the solder parts 4b and part of the surface 4a of the substrate 4 are exposed through the openings 31 without being covered by the reflective sheets 3. Since the light reflectivity of the soldered parts 4b and the surface 4a is lower than the light reflectivity of the reflective sheets 3, the openings 31 should be formed as small as possible, taking into account the above variations and the expansion and contraction.

Therefore, in the first embodiment, as shown in FIG. 5, the openings 31 of the reflective sheets 3 include a plurality of first openings 31a disposed at a first distance D1 in the first direction A relative to the first adhesive member 6a, and a plurality of second openings 31a disposed at a second distance D2 greater than the first distance D1 in the first direction A relative to the first adhesive member 6a. In particular, in the first embodiment, the first reflective sheet 3a has eight first openings 31a and eight second openings 31b. Specifically, the first openings 31a are located in areas RB of the first reflective sheet 3a between the first adhesive member 6a and the second adhesive members 6b, while the second openings 31b are located in areas of the first reflective sheet 3a between the second adhesive members 6b and the peripheral portion of the first reflective sheet 3a. Furthermore, the second openings 31b have a larger dimension in the first direction A than the first openings 31a. Specifically, the first openings 31a shown in FIG. 6A have a length L1 in the first direction A. The second openings 31b shown in FIG. 6B have a length L2 in the first direction A. The length L2 is larger than the length L1.

More specifically, the openings 31 are formed such that the larger the distance in the first direction A from the first adhesive member 6a, the larger the opening dimension (inner dimension or length) in the first direction A. In other words, the openings 31 are formed such that the smaller the distance in the first direction A from the first adhesive member 6a, the smaller the opening dimension (inner dimension or length) in the first direction A. Thus, for example, when third openings are provided at a further distance than the second openings 31b that are disposed at the second distance D2 relative to the first adhesive member 6a, the opening dimension of the third openings in the first direction A is larger than the opening dimension (length L2) of the second openings 31b in the first direction A. Since the amount of expansion and contraction of the reflective sheets 3 increases according to the distance from the first adhesive member 6a in the first direction A, the size of each opening 31 is set to be the minimum necessary according to the amount of expansion and contraction of the reflective sheets 3. In the first embodiment, the openings 31 of the second reflective sheet 3b can have the same opening dimension (length L1) as the first openings 31a of the first reflective sheet 3a. However, the openings 31 of the second reflective sheet 3b can have different opening dimension from the first openings 31a, and have the same opening dimension (length L2) as the second openings 31b of the first reflective sheet 3a.

Effect of First Embodiment

The following effects can be obtained with the first embodiment.

The backlight unit 10 and the liquid crystal display device 100 according to the first embodiment, as described above, comprises the reflector or reflective sheet assembly with the reflective sheets 3 having the openings 31 that expose the LEDs 1, respectively. The reflective sheets 3 are arranged to dividedly cover the installation surface 2c of the holding member 2. The reflective sheets 3 include the first reflective sheet 3a having the engagement pieces 32 at the peripheral portion of the first reflective sheet 3a and the second reflective sheet 3b adjacent to the first reflective sheet 3a and having the engaged portions 33 that is shiftably engaged with the engagement pieces 32, respectively. With this configuration, the reflector or reflective sheet assembly is divided into a plurality of parts (i.e., the first and second reflective sheets 3a and 3b), and the first reflective sheet 3a and the second reflective sheet 3b that are adjacent to each other can be engaged with each other by the engagement pieces 32 and the engaged portions 33 in a shiftable manner. As a result, even when thermal expansion occurs in the first reflective sheet 3a and the second reflective sheet 3b, the amount of expansion can be absorbed by the engagement pieces 32 and the engaged portions 33 that are shiftable relative to each other. Thus, wrinkles in the first and second reflective sheets 3a and 3b caused by thermal expansion of the first and second reflective sheets 3a and 3b due to temperature changes can be suppressed. In other words, even when the first reflective sheet 3a and the second reflective sheet 3b expand thermally toward the boundary portion (the area RD) between the first and second reflective sheets 3a and 3b, the engagement pieces 32 and the engaged portions 33 can be positionally shifted by the amount of expansion in the area RD, and thus wrinkles (ripples) in the first and second reflective sheets 3a and 3b can be suppressed.

Furthermore, with the configuration above, since the engagement pieces 32 and the engaged portions 33 can be positionally shifted while being engaged with each other, the edge portions of the first and second reflective sheets 3a and 3b (the edge 34 and the edge 35) can be prevented from turning up without adhering the boundary portion (the area RD) between the first reflective sheet 3a and the second reflective sheet 3b. In addition, since the first reflective sheet 3a and the second reflective sheet 3b can be installed to the holding member 2 in an engaged state as a unit. In other words, before installation, the reflector or reflective sheet assembly can be constructed as a unit by engaging the first reflective sheet 3a and the second reflective sheet 3b in advance, and this reflector or reflective sheet assembly can be installed to the holding member 2 as a unit. As a result, the first and second reflective sheets 3a and 3b can be handled as if they are a single (one) reflective sheet, and thus the assembly workability can be improved, compared to the case where a plurality of reflective sheets 3 are separately installed one by one.

In the first embodiment, as described above, the engagement pieces 32 protrude outward from the peripheral portion of the first reflective sheet 3a, and the engaged portions 33 include slits that are provided on the second reflective sheet 3b and into which the engagement pieces 32 are inserted, respectively. With this configuration, it is possible to shiftably engage the first reflective sheet 3a and the second reflective sheet 3b with a simple configuration of inserting the engagement pieces 32 into the slits (the engaged portions 33). With this configuration, high assembly workability can be realized although it has a configuration that can absorb the thermal expansion of the first and second reflective sheets 3a and 3b. In addition, since the shapes of the engagement pieces 32 and the engaged portions 33 can be simplified and have less irregularity, unevenness in the intensity distribution of the reflected light by the first and second reflective sheets 3a and 3b can be suppressed even if the engagement pieces 32 and the engaged portions 33 are formed on the first and second reflective sheets 3a and 3b, respectively.

In the first embodiment, as described above, the engaged portions 33 are located at a position inside relative to the peripheral portion of the second reflective sheet 3b such that the peripheral portion of the first reflective sheet 3a overlaps the peripheral portion of the second reflective sheet 3b when the engaged portions 33 are engaged with the engagement pieces 32. This configuration prevents the formation of an area that is not covered by any of the first and second reflective sheets 3a and 3b at the boundary portion between the first reflective sheet 3a and the second reflective sheet 3b. With this configuration, unevenness in the intensity distribution of the reflected light by the first and second reflective sheets 3a and 3b can be suppressed.

In the first embodiment, as described above, the first reflective sheet 3a and the second reflective sheet 3b are each made of a resin sheet with a relatively large amount of thermal expansion in the first direction A within the sheet surface and a relatively small amount of thermal expansion in the second direction B orthogonal to the first direction A within the sheet surface, the engagement pieces 32 extend from the peripheral portion of the first reflective sheet 3a in the first direction A, and the engaged portions 33 of the second reflective sheet 3b are shiftably engaged with the engagement pieces 32 in the first direction A, respectively. With this configuration, since the amount of expansion in the first direction A, where the amount of thermal expansion is particularly large, can be absorbed by the positional shift that maintains the engaged state of the first reflective sheet 3a and the second reflective sheet 3b, wrinkles in the first and second reflective sheets 3a and 3b caused by thermal expansion can be suppressed more effectively.

In the backlight unit 10 and the liquid crystal display device 100 according to the first embodiment, as described above, comprises the reflector or reflective sheet assembly (the reflective sheets 3) being fixedly attached to the predetermined position of the holding member 2 by the first adhesive member 6a that adheres the reflector or reflective sheet assembly (the reflective sheets 3) immovably in the direction along the installation surface 2c and the second adhesive member that is disposed between the first adhesive member 6a and the peripheral portion of the reflector or reflective sheet assembly (the reflective sheets 3) and adheres the reflector or reflective sheet assembly (the reflective sheets 3) shiftably in the direction along the installation surface 2c. With this configuration, the first adhesive member 6a positions the reflector or reflective sheet assembly (the reflective sheets 3) in an in-plane direction and fixes the reflector or reflective sheet assembly (the reflective sheets 3), whereas the second adhesive member 6b can adhere the reflector or reflective sheet assembly (the reflective sheets 3) around the first adhesive member 6a in a shiftable manner in the in-plane direction. As a result, when thermal expansion occurs in the reflector or reflective sheet assembly (the reflective sheets 3), the reflector or reflective sheet assembly (the reflective sheets 3) stretches (expands) toward the peripheral portion around the fixed position by the first adhesive member 6a, but the second adhesive member 6b can allow the positional shift caused by the expansion toward the peripheral portion. Thus, wrinkles in the reflector or reflective sheet assembly (the reflective sheets 3) can be suppressed in the area between the first adhesive member 6a and the second adhesive member 6b. Therefore, wrinkles in the reflector or reflective sheet assembly (the reflective sheets 3) caused by thermal expansion of the reflector or reflective sheet assembly (the reflective sheets 3) due to temperature changes can be suppressed.

Figure 7A:
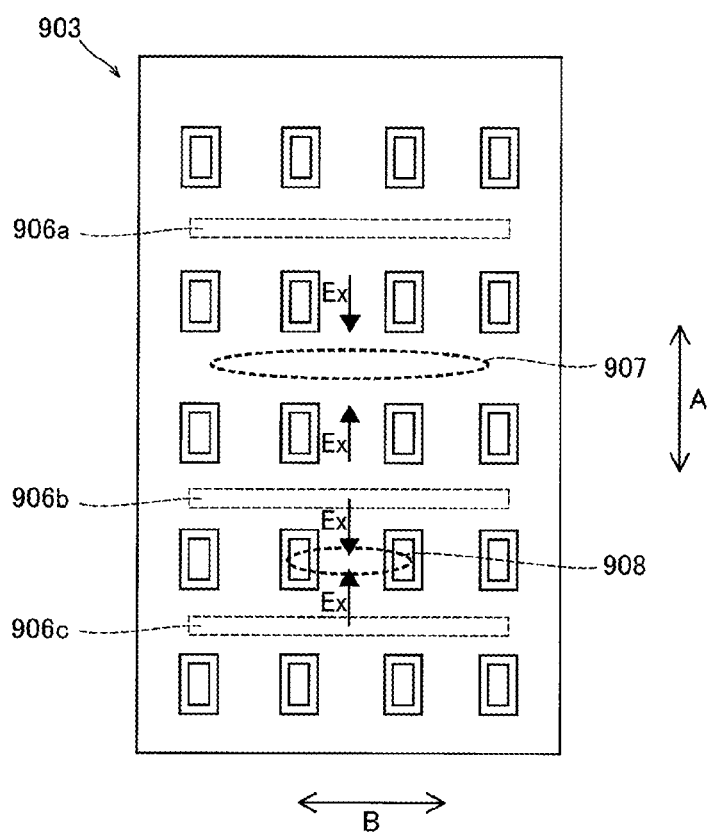
FIG. 7A is a plan view of a reflective sheet and a plurality of LEDs according to a comparative example.
Figure 7B:
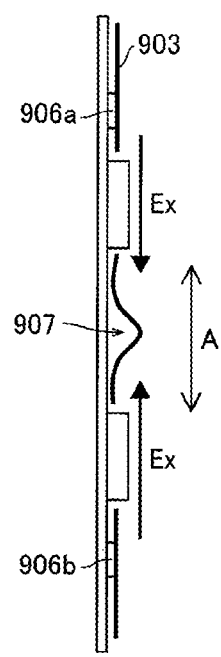
FIG. 7B is a schematic enlarged cross-sectional view of an area in which wrinkles occur according to the comparative example.

Specifically, as a comparative example shown in FIG. 7A, when one reflective sheet 903 is fixed by a plurality of adhesive members 906a, 906b, and 906c of the same type, thermal expansion occurs in the reflective sheet 903 in a direction away from each adhesive member 906a, 906b, and 906c (see arrows Ex). As a result, the reflective sheet 903 expands toward an area 907 between the adhesive member 906a and the adhesive member 906b that are adjacent to each other, and toward an area 908 between the adhesive member 906b and the adhesive member 906c that are adjacent to each other such that the areas 907 and 908 of the reflective sheet 903 are pushed from both sides thereof, respectively, and wrinkles (ripples) are formed on the reflective sheet 903 at the area 907 (see FIG. 7B) and the area 908. Although not shown in the drawings, the wrinkles occurring in the area 908 are also the same as in FIG. 7B.

On the other hand, in the first embodiment above (see FIG. 3), since the second adhesive members 6b are provided on the peripheral portion side relative to the first adhesive member 6a and shiftably adhere the first reflective sheet 3a relative to the holding member 2 (the substrate 4), thermal expansion occurring in the direction away from the first adhesive member 6a (see the arrows Ex) can be absorbed by the positional shift by the second adhesive members 6b. As a result, the formation of the wrinkles (ripples) on the first reflective sheet 3a in the areas RB (see FIG. 3) between the first adhesive member 6a and the second adhesive members 6b can be prevented. Furthermore, according to the first embodiment, since the second adhesive members 6b maintain the adhered state while allowing the positional shift caused by the expansion and contraction of the first reflective sheet 3a, the edge portion of the first reflective sheet 3a can be prevented from turning up.

In the first embodiment above, as shown in FIG. 3, since at least one of the reflective sheets 3 (the first reflective sheet 3a) is provided with the first adhesive member 6a and the second adhesive members 6b, it is possible not only to suppress wrinkles caused by thermal expansion at the boundary portion (the area RD) between the first and second reflective sheets 3a and 3b by dividing the reflector or reflective sheet assembly into a plurality of parts (the first and second reflective sheet 3a and 3b), but also to suppress wrinkles in the areas between the multiple adhering locations (the areas RB) on the first reflective sheet 3a.

In the first embodiment, as described above, the first adhesive member 6a is provided at one location within the surface of the first reflective sheet 3a, and the second adhesive members 6b are provided at the plurality of locations on the peripheral portion side of the first reflective sheets 3a relative to the first adhesive member 6a. With this configuration, when thermal expansion occurs in the first reflective sheet 3a, the first reflective sheet 3a extends toward the peripheral portion side around one fixed location where the first adhesive member 6a is provided. While absorbing this expansion of the first reflective sheet 3a by the second adhesive members 6b, the second adhesive members 6b can effectively suppress the turning up, lifting, and warping of the first reflective sheet 3a. As a result, unevenness in the intensity distribution of reflected light by the first reflective sheet 3a can be effectively suppressed.

In the first embodiment, as described above, the reflector or reflective sheet assembly (the reflective sheets 3) is made of a resin sheet with a relatively large amount of thermal expansion in the first direction A within the sheet surface and a relatively small amount of thermal expansion in the second direction B orthogonal to the first direction A within the sheet surface, the first adhesive member 6a is provided at the center side of the first reflective sheet 3a in the first direction A, and the second adhesive members 6b are provided spaced apart from the first adhesive member 6a in the first direction A. With this configuration, the first reflective sheet 3a positionally shifts (expands) relatively large in the first direction A away from the fixed position by the first adhesive member 6a when the thermal expansion occurs, but the amount of expansion in the first direction A can be absorbed by the second adhesive members 6b. Thus, wrinkles in the first reflective sheet 3a caused by thermal expansion can be suppressed more effectively.

In the first embodiment, as described above, the first adhesive members 6a and the second adhesive members 6b are each provided to extend linearly along the second direction B, and are arranged spaced apart along the first direction A. With this configuration, a large adhesive area can be easily secured by the first adhesive members 6a and the second adhesive members 6b extending linearly in the second direction B, in which the amount of thermal expansion is small, and the direction of positional shift due to thermal expansion of the reflector or reflective sheet assembly (the reflective sheets 3) can be substantially limited to the first direction A. Furthermore, this positional shift in the first direction A can be effectively absorbed by the second adhesive members 6b.

In the first embodiment, as described above, the openings 31 of the first reflective sheet 3a include the first openings 31a disposed at the first distance D1 in the first direction A relative to the first adhesive member 6a, and the second openings 31b disposed at the second distance D2 greater than the first distance D1 in the first direction A relative to the first adhesive member 6a, and the second openings 31b have a larger dimension in the first direction A than the first openings 31a. With this configuration, since the positional shift of the openings 31 due to thermal expansion of the first reflective sheet 3a increases as moving away from the first adhesive member 6a that fixes the first reflective sheet 3a in the first direction A, the second openings 31b that have a larger dimension in the first direction A can avoid contact between the first reflective sheet 3a and the LEDs 1 even when the positional shift occurs. Furthermore, since the first openings 31a that have a smaller distance from the first adhesive member 6a also have a smaller positional shift caused by thermal expansion, the dimension in the first direction A can be reduced compared to the second openings 31b, and areas that are not covered by the first reflective sheet 3a between the edge portions of the first openings 31a and the LEDs 1 can be minimized. As a result, unevenness in the intensity distribution of reflected light by the first reflective sheet 3a can be prevented.

In the first embodiment, as described above, the first adhesive members 6a and the second adhesive members 6b each include at least one of adhesive tape or glue, and the second adhesive members 6b are made of a material that has lower adhesive strength or is more easily deformed than the first adhesive members 6a. With this configuration, while the first reflective sheet 3a and the second reflective sheet 3b are fixed by the first adhesive members 6a, respectively, by using the adhesive members 6 that have lower adhesive strength or are more easily deformed than the first adhesive members 6a as the second adhesive members 6b, a configuration is easily realized that can prevent the first reflective sheet 3a from turning up or lifting while allowing positional shift.

Second Embodiment

Figure 8:
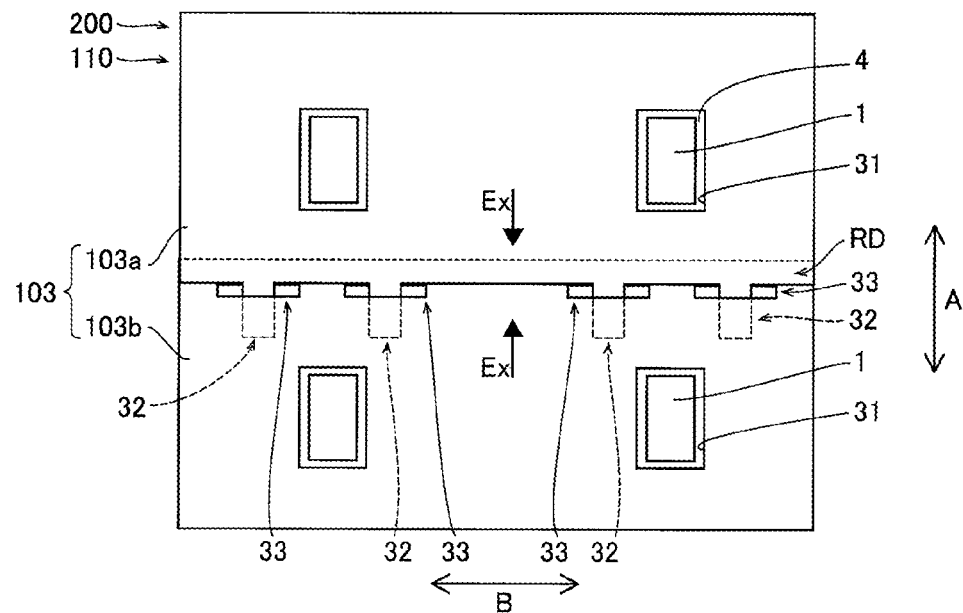
FIG. 8 is a plan view of a reflective sheet assembly according to a second embodiment, illustrating a plurality of LEDs exposed through openings of the reflective sheet assembly.
Figure 9:
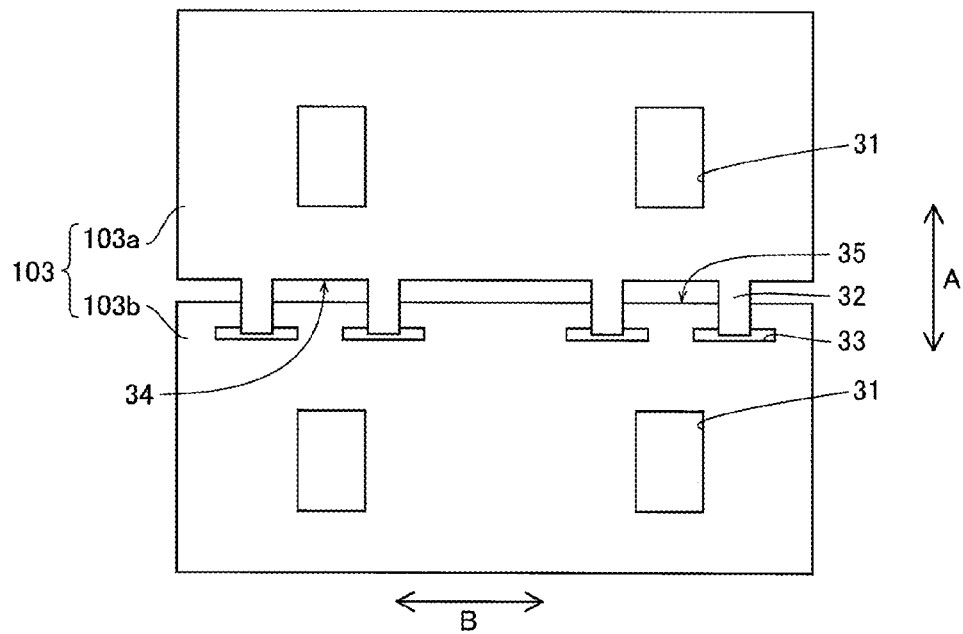
FIG. 9 is an exploded plan view of the reflective sheet assembly, illustrating a plurality of reflective sheets separated from each other.

Referring to FIGS. 8 and 9, the configuration of a backlight unit 110 and a liquid crystal display device 200 according to a second embodiment will be explained. Unlike the first embodiment in which the first adhesive members 6a and the second adhesive members 6b are provided for the reflective sheets 3, the second embodiment shows an example in which the first adhesive members 6a and the second adhesive members 6b are not provided for each reflective sheet 103. The backlight unit 110 and the liquid crystal display device 200 are examples of the "surface light source device" and "display device" of the present disclosure, respectively. In the second embodiment, the configuration other than the reflective sheets 103 is the same as in the first embodiment above. In view of the similarity between the first and second embodiments, the parts of the second embodiment that are similar or identical to the parts of the first embodiment will be given the same reference numerals as the parts of the first embodiment. Moreover, the descriptions of the parts of the second embodiment that are similar or identical to the parts of the first embodiment may be omitted for the sake of brevity.

As shown in FIGS. 8 and 9, the liquid crystal display device 200 (the backlight unit 110) is equipped with a plurality of reflective sheets 103 including a first reflective sheet 103a and a second reflective sheet 103b. The example in FIG. 8 shows an example in which the first reflective sheet 103a has four engagement pieces 32 and the second reflective sheet 103b has four engaged portions 33. Specifically, as shown in FIG. 8, the engagement pieces 32 has a rectangular shape and the engaged portions 33 includes a straight slit or a rectangular aperture. FIG. 8 schematically illustrates only four LEDs 1, but the number of LEDs 1 is not limited to this.

The reflective sheets 103 are fixed at predetermined locations on the holding member 2, respectively. In the second embodiment, the reflective sheets 103 may be fixed by the adhesive members 6 or by fixing means other than the adhesive members 6, respectively. For example, a fastening member such as a screw or a crimping member such as a rivet may be used as the fixing means other than the adhesive members 6. When thermal expansion occurs, each of the reflective sheets 103 expands in a direction away from the fixed position. In FIGS. 8 and 9, the fixing means is not shown.

Even when thermal expansion occurs in each reflective sheet 103, the edge 34 of the first reflective sheet 103a is shiftable toward the second reflective sheet 103b and the edge 35 of the second reflective sheet 103b is shiftable toward the first reflective sheet 103a while maintaining the engaged state between the engagement pieces 32 and the engaged portions 33. As a result, wrinkles of the reflective sheets 3 are suppressed at the boundary portion between the first reflective sheet 103a and the second reflective sheet 103b (the area RD).

In the second embodiment, although the second adhesive members 6b are not provided on each reflective sheet 103, the engagement pieces 32 and the engaged portions 33 engage with each other at the peripheral portions of the reflective sheets 103. This prevents the peripheral portions of the reflective sheets 103 from turning up, lifting, and warping.

The other configuration of the second embodiment is the same as the first embodiment above.

Effect of Second Embodiment

In the second embodiment, as described above, the reflective sheets 103 include the first reflective sheet 103a and the second reflective sheet 103b. Thus, wrinkles can be suppressed in the reflective sheets 103 due to thermal expansion of the reflective sheets 103 caused by temperature changes, as in the first embodiment above. Furthermore, with the configuration above, the edge portions of the reflective sheets 103 (the edge 34 and the edge 35) can be prevented from turning up without adhering the boundary portion (the area RD) between the first reflective sheet 103a and the second reflective sheet 103b. In addition, the reflective sheets 103 can be handled as if they are a single (one) reflective sheet, and thus the assembly workability can be improved, compared to the case where a plurality of reflective sheets are separately installed one by one.

Other effects of the second embodiment are the same as those of the first embodiment.

Third Embodiment

Figure 10:
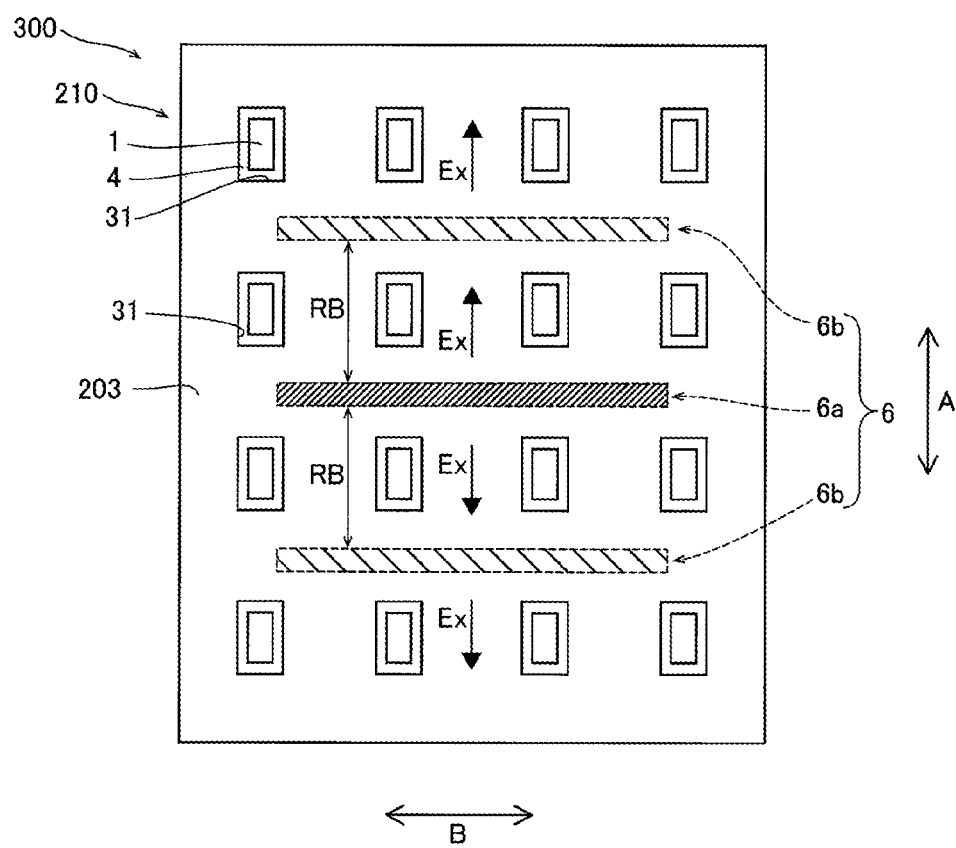
FIG. 10 is a plan view of a reflective sheet and a plurality of LEDs according to a third embodiment.

Referring to FIG. 10, the configuration of a backlight unit 210 and a liquid crystal display device 300 according to a third embodiment will be explained. The third embodiment shows an example in which a single reflective sheet 203 is provided with the first adhesive member 6a and the second adhesive members 6b, unlike the first embodiment in which the plurality of reflective sheets 3 are provided. The backlight unit 210 and the liquid crystal display device 300 are examples of the "surface light source device" and "display device" of the present disclosure, respectively. In the third embodiment, the configuration other than the reflective sheet 203 is the same as in the first embodiment above. In view of the similarity between the first and third embodiments, the parts of the third embodiment that are similar or identical to the parts of the first embodiment will be given the same reference numerals as the parts of the first embodiment. Moreover, the descriptions of the parts of the third embodiment that are similar or identical to the parts of the first embodiment may be omitted for the sake of brevity.

As shown in FIG. 10, the liquid crystal display device 300 (the backlight unit 210) differs from the first embodiment above in that it has a reflector formed by the single reflective sheet 203. The reflective sheet 203 has the openings 31 that expose the LEDs 1, respectively, and is arranged to cover the installation surface 2c of the holding member 2 (see FIG. 1). Since the reflective sheet 203 is formed as a single, unitary member, it is not provided with the engagement pieces 32 and the engaged portions 33, unlike the first embodiment above. The liquid crystal display device 300 (the backlight unit 210) is equipped with the adhesive members 6 for fixing the reflective sheet 203 to a predetermined position of the holding member 2 (see FIG. 1). The openings 31 of the reflective sheet 203 are configured in the same manner as the openings 31 (the first openings 31a and the second openings 31b) of the first reflective sheet 3a of the first embodiment.

The adhesive members 6 include the first adhesive member 6a that adheres the reflective sheet 203 immovably relative to the holding member 2 (the substrate 4) in a direction along the installation surface 2c (see FIG. 1), and the second adhesive members 6b that are disposed between the first adhesive member 6a and the peripheral portion of the reflective sheet 203 and adheres the reflective sheet 203 shiftably relative to the holding member 2 (the substrate 4) in the direction along the installation surface 2c. The first adhesive member 6a and the second adhesive members 6b are made of the same adhesive tape or glue as in the first embodiment above.

As shown in FIG. 10, the first adhesive member 6a is provided at one location within the surface of the reflective sheet 203, and the second adhesive members 6b are provided at a plurality of (two) locations on the peripheral portion side of the reflective sheet 203 relative to the first adhesive member 6a. The first adhesive member 6a is provided at the center side of the reflective sheet 203 in the first direction A, and the second adhesive members 6b are provided spaced apart from the first adhesive member 6a in the first direction A.

In FIG. 10, for one first adhesive member 6a, one second adhesive member 6b is provided on each side in the first direction A. The first adhesive member 6a and the second adhesive members 6b are each provided to extend linearly along the second direction B, and are arranged spaced apart from each other along the first direction A.

With this configuration, the reflective sheet 203 thermally expands mainly along the first direction A. The thermal expansion occurs in a direction away from the fixed position by the first adhesive member 6a (see arrows Ex).

Even if thermal expansion occurs in the reflective sheet 203, the adhering locations of the reflective sheet 203 by the second adhesive members 6b positionally shift in the direction away from the first adhesive member 6a. Therefore, wrinkles of the sheet are prevented in the areas RB between the first adhesive member 6a and the second adhesive members 6b.

A second adhesive member 6b may be further provided on the peripheral portion of the reflective sheet 203. This effectively suppresses the turning up, lifting, and warping of the peripheral portion of the reflective sheet 203 while suppressing the occurrence of wrinkles of the sheet.

The other configuration of the third embodiment is the same as the first embodiment above.

Effect of Third Embodiment

In the third embodiment, as described above, the adhesive members 6 include the first adhesive member 6a that adheres the reflective sheet 203 immovably in the direction along the installation surface 2c, and the second adhesive members 6b that are disposed between the first adhesive member 6a and the peripheral portion of the reflective sheet 203 and adheres the reflective sheet 203 shiftably in the direction along the installation surface 2c. With this configuration, as in the first embodiment above, the second adhesive members 6b can allow the positional shift caused by the expansion. Thus, wrinkles in the reflective sheet 203 can be suppressed in the areas RB between the first adhesive member 6a and the second adhesive members 6b. Therefore, wrinkles in the reflective sheet 203 caused by thermal expansion of the reflective sheet 203 due to temperature changes can be suppressed.

Other effects of the third embodiment are the same as the first embodiment.

Fourth Embodiment

Figure 11:
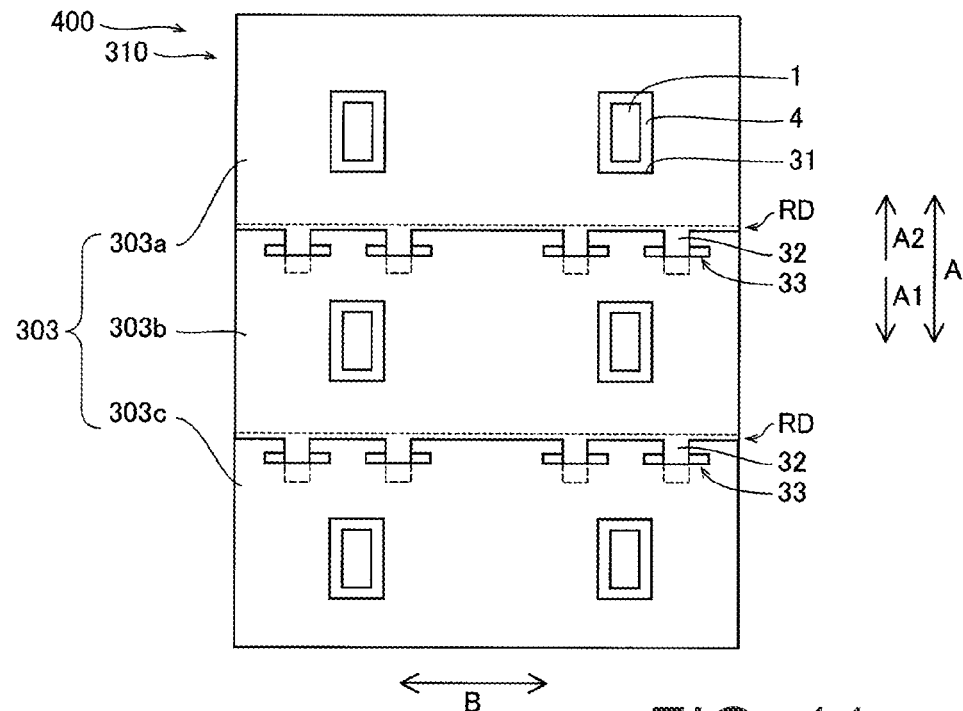
FIG. 11 is a plan view of a reflective sheet assembly according to a fourth embodiment, illustrating a plurality of LEDs exposed through openings of the reflective sheet assembly.
Figure 12:
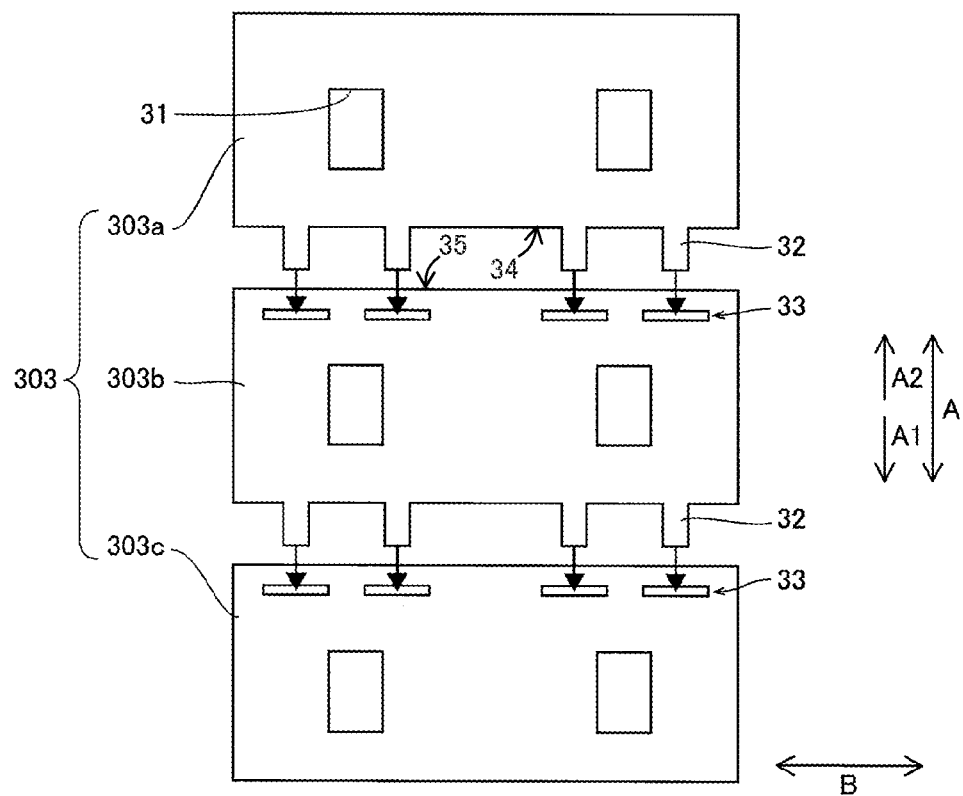
FIG. 12 is an exploded plan view of the reflective sheet assembly, illustrating a plurality of reflective sheets separated from each other.

Referring to FIGS. 11 and 12, the configuration of a backlight unit 310 and a liquid crystal display device 400 according to a fourth embodiment will be explained. The fourth embodiment shows an example in which three reflective sheets 303 are provided, unlike the first embodiment in which two reflective sheets 3 are provided. The backlight unit 310 and the liquid crystal display device 400 are examples of the "surface light source device" and "display device" of the present disclosure, respectively. In the fourth embodiment, the configuration other than the reflective sheets 303 is the same as the first embodiment above. In view of the similarity between the first and fourth embodiments, the parts of the fourth embodiment that are similar or identical to the parts of the first embodiment will be given the same reference numerals as the parts of the first embodiment. Moreover, the descriptions of the parts of the fourth embodiment that are similar or identical to the parts of the first embodiment may be omitted for the sake of brevity.

As shown in FIGS. 11 and 12, the liquid crystal display device 400 (the backlight unit 310) differs from the first embodiment above in that the reflective sheets 303 further includes a third reflective sheet 303c in addition to a first reflective sheet 303a and a second reflective sheet 303b. The example in FIG. 12 shows an example in which a total of three reflective sheets are provided by providing one first reflective sheet 303a, one second reflective sheet 303b and one third reflective sheet 303c. Thus, in the fourth embodiment, the first reflective sheet 303a is integrally formed as a single, unitary member. The second reflective sheet 303b is also integrally formed as a single, unitary member. The third reflective sheet 303c is also integrally formed as a single, unitary member. Then, a reflector or reflective sheet assembly is formed by the first reflective sheet 303a, the second reflective sheet 303b and the third reflective sheet 303c that are independently formed as separate members.

The first reflective sheet 303a has the engagement pieces 32 similar to the first reflective sheet 3a of the first embodiment. The second reflective sheet 303b differs from the second reflective sheet 3b of the first embodiment in that it has the engaged portions 33 on the first reflective sheet 303a side within the sheet surface and the engagement pieces 32 on the third reflective sheet 303c side within the sheet surface. The third reflective sheet 303c is provided adjacent to the second reflective sheet 303b at a position opposite to the first reflective sheet 303a in a direction along the installation surface 2c. The third reflective sheet 303c has the engaged portions 33 on the second reflective sheet 303b side within the sheet surface that engages with the engagement pieces 32 of the second reflective sheet 303b. Specifically, as shown in FIGS. 11 and 12, the engagement pieces 32 has a rectangular shape and the engaged portions 33 includes a straight slit or a rectangular aperture.

In a more generalized explanation, in the fourth embodiment, three or more reflective sheets 303 are arranged along a predetermined direction (the first direction A). One side of the predetermined direction is referred to as an A1 direction, and the other side of the predetermined direction is referred to as an A2 direction. Out of the reflective sheets 303, reflective sheets 303 (the first reflective sheet 303a and the second reflective sheet 303b), except for a reflective sheet 303 provided at an end portion on the A1 direction side (the third reflective sheet 303c), are provided with the engagement pieces 32 toward the A1 direction, respectively. Out of the reflective sheets 303, reflective sheets 303 (the second reflective sheet 303b and the third reflective sheet 303c), except for a reflective sheet 303 provided at an end portion on the A2 direction side (the first reflective sheet 303a), are provided with the engaged portions 33 near the peripheral portion on the A2 direction side, respectively.

With this configuration, as shown in FIG. 12, all of the reflective sheets 303 can be engaged with each other in the same direction when the reflective sheets 303 are engaged with each other to form the reflective sheet assembly prior to an installation into the holding member 2. In other words, the engagement pieces 32 of the first reflective sheet 303a are inserted into the engaged portions 33 of the second reflective sheet 303b toward one side of the predetermined direction (the A1 direction side). Then, the engagement pieces 32 of the second reflective sheet 303b are inserted into the engaged portions 33 of the third reflective sheet 303c toward one side of the predetermined direction (the A1 direction side). As a result, the insertion direction of the engagement pieces 32 is always the same (the A1 direction) during assembly.

The same applies when the reflective sheets 303 are divided into four or more parts. In that case, the number of second reflective sheets 303b disposed in the middle (the number of reflective sheets 303 with both the engagement pieces 32 and the engaged portions 33) is increased.

The other configurations of the fourth embodiment are the same as the first embodiment above.

Effect of Fourth Embodiment

In the fourth embodiment, as described above, the reflective sheets 303 include the first reflective sheet 303a and the second reflective sheet 303b. Thus, wrinkles can be suppressed in the reflective sheets 303 due to thermal expansion of the reflective sheets 303 caused by temperature changes, as in the first embodiment above. Furthermore, with the configuration above, the edge portions of the reflective sheets 303 (the edge 34 and the edge 35) can be prevented from turning up without adhering the boundary portion (the area RD) between the first reflective sheet 303a and the second reflective sheet 303b. In addition, the reflective sheets 303 can be handled as if they are a single (one) reflective sheet, and thus the assembly workability can be improved, compared to the case where a plurality of reflective sheets are separately installed one by one.

In the fourth embodiment, as described above, the reflective sheets 303 further include the third reflective sheet 303c adjacent to the second reflective sheet 303b at a position opposite to the first reflective sheet 303a in the direction along the installation surface 2c, the second reflective sheet 303b has the engaged portions 33 on the first reflective sheet 303a side within the sheet surface and the engagement piece 32 at the peripheral portion of the second reflective sheet 303b on the third reflective sheet 303c side within the sheet surface, and the third reflective sheet 303c has the engaged portions 33 on the second reflective sheet 303b side within the sheet surface that is engaged with the engagement pieces 32 of the second reflective sheet 303b. With this configuration, the direction in which the first reflective sheet 303a is engaged with the second reflective sheet 303b (the direction in which the engagement pieces 32 of the first reflective sheet 303a are engaged with the engaged portions 33 of the second reflective sheet 303b) and the direction in which the second reflective sheet 303b is engaged with the third reflective sheet 303c can be aligned. Therefore, the assembly work can be done simply by engaging each reflective sheet 303 in turn from the end portion side in the same direction. If there are more than four reflective sheets 303, the number of the second reflective sheets 303b can be increased. Therefore, even when the installation surface 2c (see FIG. 1) of the holding member 2 is dividedly covered by three or more reflective sheets 303, the workability of assembling each reflective sheet 303 can be effectively improved.

Other effects of the fourth embodiment are the same as those of the first embodiment.

Modification Example

The embodiments disclosed here are illustrative and are not restrictive in all respects. The scope of the invention is indicated by the claims rather than by the description of the embodiments described above, and furthermore includes all modifications (modification examples) within the meaning and scope of the claims and their equivalents.

For example, in the first, second and fourth embodiments above, an example is shown in which the engagement pieces 32 have a rectangular shape and the engaged portions 33 are a straight slit or a rectangular aperture, but the present invention is not limited to this. In the present invention, the engagement pieces 32 may have a shape other than a rectangle. The engaged portions 33 may be a slit or aperture of a shape other than straight.

Figure 13A:
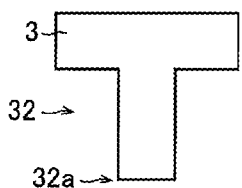
FIGS. 13A, 13B, 13C, 13D, 13E and 13F illustrate modification examples of an engagement piece.
Figure 13B:
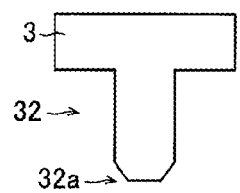
Figure 13C:
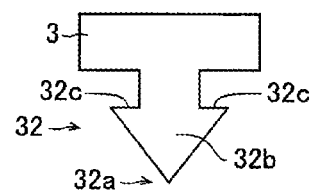
Figure 13D:
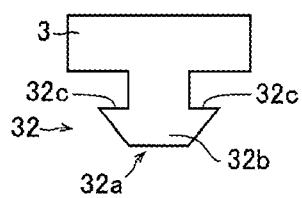
Figure 13E:
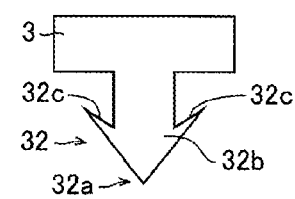
Figure 13F:
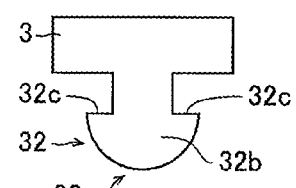

FIGS. 13A to 13F show modification examples of the engagement piece 32. FIG. 13A illustrates the engagement piece 32 of the first, second and fourth embodiments above. FIG. 13B illustrates an engagement piece 32 having a distal end portion 32a with a tapered shape. With this configuration, the engagement piece 32 can be easily inserted into an engaged portion 33. The engagement piece 32 may be shaped as shown in FIGS. 13C to 13F. Specifically, the engagement piece 32 may include a protruding portion 32b that protrudes from the peripheral portion of the first reflective sheet 3a (or the second reflective sheet 3b) and has a tapered distal end portion 32a, and a retaining portion 32c that protrudes laterally relative to the protruding portion 32b. In particular, FIG. 13C shows an engagement piece 32 formed in a triangular shape (arrow shape) by a protruding portion 32b and a retaining portion 32c. FIG. 13D shows an engagement piece 32 with a distal end portion 32a formed in a trapezoidal shape. FIG. 13F shows an arrow-shaped engagement piece 32 with a retaining portion 32c being deformed toward the base portion, compared to the engagement piece 32 in FIG. 13C. FIG. 13F shows an engagement piece 32 with a distal end portion 32a formed in a semicircular shape.

Thus, in the examples shown in FIGS. 13C to 13F, the tapered protruding portion 32b can make it easier to insert the engagement piece 32 into the engaged portion 33. This effectively improves the assembly workability even when a plurality of reflective sheets 3 are installed. Furthermore, after inserting the engagement piece 32 into the engaged portion 33, the retaining portion 32c protruding laterally can make it difficult for the engagement piece 32 to come out of the engaged portion 33, and thus the assembly workability can be further effectively improved.

Figure 14A:
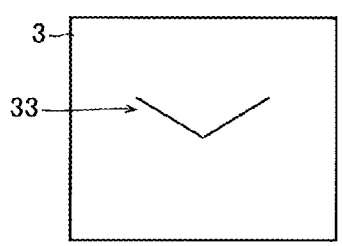
FIG. 14A is an enlarged plan view of an engaged portion according to a first modification example.
Figure 14B:
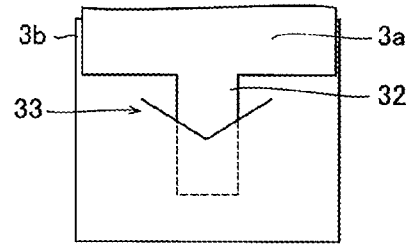
FIG. 14B is an enlarged plan view illustrating a state in which the engaged portion in FIG. 14A is engaged with an engagement piece according to the first modification example.
Figure 15A:
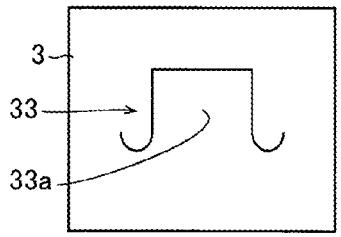
FIG. 15A is an enlarged plan view of an engaged portion according to a second modification example.
Figure 15B:
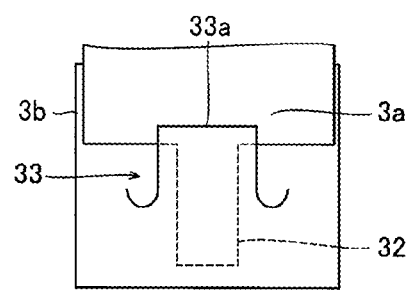
FIG. 15B is an enlarged plan view illustrating a state in which the engaged portion in FIG. 15A is engaged with an engagement piece according to the second modification example.

FIGS. 14A, 14B, 15A, 15B, 16A and 16B show modification examples of the engaged portion 33. As shown in FIGS. 14A and 14B, an engaged portion 33 according to a first modification example can be formed as a V-shaped slit. With this configuration, the V-shape makes it easier to insert the engagement piece 32 into the engaged portion 33. As show in FIGS. 15A and 15B, an engaged portion 33 according to a second modification example can be formed of slits (inverted U-shaped slits) that make up three sides of a rectangle. With this configuration, the engaged portion 33 has a flap part 33a that can be displaced in the thickness direction of the reflective sheet 3. Since the flap part 33a can be displaced to widen the slit when inserting the engagement piece 32, the engagement piece 32 can be easily inserted into the engaged portion 33.

Figure 16A:
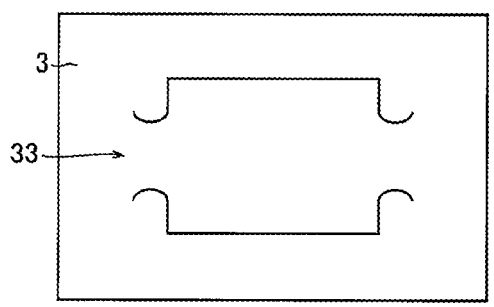
FIG. 16A is an enlarged plan view of an engaged portion according to a third modification example.
Figure 16B:
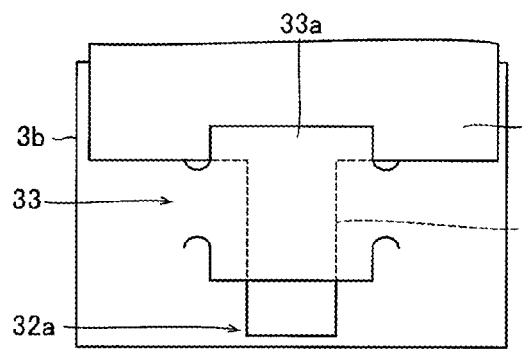
FIG. 16B is an enlarged plan view illustrating a first engaged state of the engaged portion in FIG. 16A and an engagement piece according to the third modification example.
Figure 16C:
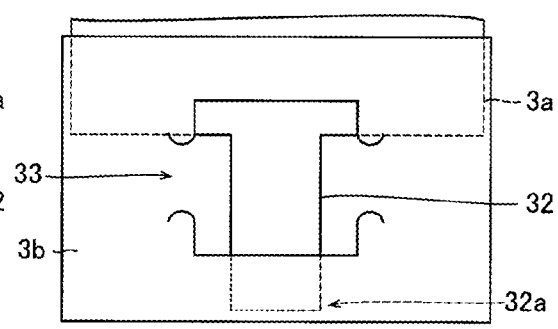
FIG. 16C is an enlarged plan view illustrating a second engaged state of the engaged portion in FIG. 16A and the engagement piece according to the third modification example.

As shown in FIGS. 16A, 16B and 16C, an engaged portion 33 according to a third modification example is formed of two slits arranged along the insertion direction of an engagement piece 32. Therefore, as shown in FIGS. 16B and 16C, the engaged portion 33 is engaged such that the engagement piece 32 is inserted through a first slit and a distal end portion 32a of the engagement piece 32 comes out through a second slit. Specifically, FIG. 16B shows an example in which the engagement piece 32 is inserted into the first slit from a front surface side of the second reflective sheet 3b, and the distal end portion 32a passes through the second slit from a rear surface side and come out to the front surface side. On the other hand, FIG. 16C shows an example in which the engagement piece 32 is inserted into the first slit from the rear surface side of the second reflective sheet 3b, and the distal end portion 32a passes through the second slit from the front surface side and comes out to the rear surface side. The engaged portion 33 may be configured in this way.

In addition to this, the engaged portion 33 can be, for example, a member that is provided separately from the second reflective sheet 3b and fixed to the second reflective sheet 3b. For example, the engaged portion 33 may be an annular sheet member fixed to the surface of the second reflective sheet 3b, and the engagement piece 32 can be inserted inside the annular portion.

In the first, second and fourth embodiments above, an example is shown in which the area RD (see FIG. 3) where the peripheral portion of the first reflective sheet 3a and the peripheral portion of the second reflective sheet 3b overlap each other is formed while the engagement pieces 32 and the engaged portions 33 are engaged, but the invention is not limited to this. For example, the edge 34 of the first reflective sheet 3a and the edge 35 of the second reflective sheet 3b may be spaced apart from each other. However, from the viewpoint of making the intensity distribution of the reflected light by the reflective sheets 3 uniform, it is preferable to form the arear RD where the first reflective sheet 3a and the second reflective sheet 3b overlap each other such that no gap is formed therebetween.

In the first to fourth embodiments above, an example is shown in which the reflective sheets 3 (103, 203, 303) are made of a resin sheet with a relatively large amount of thermal expansion in the first direction A (the so-called MD direction) and a relatively small amount of thermal expansion in the second direction B (the so-called TD direction), but the present invention is not limited to this. For example, a resin sheet whose thermal expansion does not change depending on a direction may be used for the reflective sheets. Also, sheet materials other than resin sheets, such as metal materials, may be used for the reflective sheets.

In the first, second and fourth embodiments above, an example is shown in which the engagement pieces 32 and the engaged portions 33 are engaged shiftably in the first direction A, but the present invention is not limited to this. The engagement pieces 32 and the engaged portions 33 may be engaged shiftably in the second direction B, or may be engaged shiftably in a direction different from the first direction A and the second direction B.

In the first, second and fourth embodiments above, an example is shown in which the first reflective sheets 3a and the second reflective sheets 3b are arranged along a specific direction (the first direction A), but for example, the first reflective sheets 3a and the second reflective sheets 3b may be arranged vertically and horizontally (in the first direction A and the second direction B).

In the first and third embodiments above, an example is shown in which the first adhesive member 6a is provided at one location within a surface of the reflective sheet 3 (303), but the present invention is not limited to this. For example, a plurality of first adhesive members 6a may be aligned very close to each other in the surface of the reflective sheet 3 (303). In this case, thermal expansion between adjacent first adhesive members 6a cannot be absorbed, but if the distance between the first adhesive members 6a is small enough, wrinkles will not occur in the reflective sheet 3 (303).

In the first and third embodiments above, an example is shown in which the second adhesive members 6b are provided at a plurality of locations on the peripheral portion side of the reflective sheet 3 (303) relative to the first adhesive member 6a, but the present invention is not limited to this. In the present invention, the second adhesive member 6b may be provided in only one location.

In the first and third embodiments above, an example is shown in which the second adhesive members 6b are provided spaced apart from the first adhesive member 6a in the first direction A, but the present invention is not limited to this. In the present invention, the second adhesive members 6b may be provided spaced apart from the first adhesive member 6a in the second direction B.

In the first and third embodiments above, an example is shown in which the first adhesive members 6a and the second adhesive members 6b are each provided to extend linearly along the second direction B, but the present invention is not limited to this. One or both of the first adhesive members 6a and the second adhesive members 6b may be provided so as to extend in a direction other than the second direction B, or may be provided in a shape other than linear. When the adhesive members 6 are provided linearly, they do not have to be continuous from one end to the other, and for example, a plurality of point-like adhesive members may be arranged linearly.

In the first and third embodiments above, an example is shown in which the second openings 31b, which are located farther from the first adhesive member 6a, are formed with a larger dimension in the first direction A than the first openings 31a, which are located closer to the first adhesive member 6a, but the present invention is not limited to this. In the present invention, all openings 31 may be formed to the same size.

In the first embodiment, an example is shown in which the first reflective sheet 3a has the engagement pieces 32 and the second reflective sheet 3b has the engaged portions 33, but the present invention is not limited to this. The reflector or reflective sheet assembly can be configured such that the first reflective sheet 3a has the engaged portions 33 and the second reflective sheet 3b has the engagement pieces 32 corresponding to the engaged portions 33 of the first reflective sheet 3a, or such that the first reflective sheet 3a has at least one engagement piece 32 and at least one engaged portion 33 and the second reflective sheet 3b has at least one engaged portion 33 and at least one engagement piece 32 corresponding to the at least one engagement piece 32 and the at least one engaged portion 33 of the first reflective sheet 3a, respectively. Thus, in these cases, the first reflective sheet 3a having at least one engaged portion 33 is fixedly attached relative to the holding member 2 by the first adhesive member 6a and the second adhesive members 6b in a manner illustrated in FIG. 3.

In the first to fourth embodiments above, an example of a liquid crystal display device is shown as the display device of the present invention, but the present invention is not limited to this. The display device of the present invention may be applied to a liquid crystal television device other than the liquid crystal display device. The display device of the present invention may also be applied to a display device mounted on a mobile body, such as a vehicle, for example. The display device mounted on the mobile body can be applied to an instrument panel of a vehicle, such as an automobile, for example. In this case, the external shape of the display device (the shape of the display) is designed to conform to the shape of the instrument panel. Therefore, the display device and the surface light source device of the present invention do not need to have a rectangular shape with a rectangular display surface, and for example the display surface (the light exit surface) can be any shape, such as a circular shape, an elliptical (oval) shape, or a polygonal shape other than a rectangle.

(1) In view of the state of the known technology and in accordance with a first aspect of the present invention, a surface light source device comprises a plurality of light sources configured to emit light toward a light exit surface of the surface light source device; a holding member having an installation surface on which the light sources are installed; and a reflector having a plurality of openings that expose the light sources, respectively, the reflector being arranged to cover the installation surface of the holding member, the reflector including a first reflective sheet having an engagement piece at a peripheral portion of the first reflective sheet and a second reflective sheet adjacent to the first reflective sheet and having an engaged portion that is shiftably engaged with the engagement piece.

The surface light source device according to the first aspect, as mentioned above, comprises the reflector having the openings that expose the light sources, respectively. The reflector is arranged to cover the installation surface of the holding member. The reflector includes the first reflective sheet having the engagement piece at the peripheral portion of the first reflective sheet and the second reflective sheet adjacent to the first reflective sheet and having the engaged portion that is shiftably engaged with the engagement piece. With this configuration, the reflector is divided into a plurality of parts (e.g., the first and second reflective sheets), and the first reflective sheet and the second reflective sheet that are adjacent to each other can be engaged with each other by the engagement piece and the engaged portion in a shiftable manner. As a result, even when thermal expansion occurs in the first reflective sheet and the second reflective sheet, the amount of expansion can be absorbed by the engagement piece and the engaged portion that are shiftable relative to each other. Thus, wrinkles in the first and second reflective sheets caused by thermal expansion of the first and second reflective sheets due to temperature changes can be suppressed. Furthermore, with the configuration above, since the engagement piece and the engaged portion can be positionally shifted while being engaged with each other, edge portions of the first and second reflective sheets can be prevented from turning up without adhering a boundary portion between the first reflective sheet and the second reflective sheet. In addition, since the first reflective sheet and the second reflective sheet can be installed to the holding member in an engaged state as a unit, the assembly workability can be improved, compared to a case where a plurality of reflective sheets are installed one by one.

(2) In accordance with a preferred embodiment according to the surface light source device mentioned above, the engagement piece protrudes outward from the peripheral portion of the first reflective sheet, and the engaged portion includes a slit that is provided on the second reflective sheet and into which the engagement piece is inserted. With this configuration, it is possible to shiftably engage the first reflective sheet and the second reflective sheet with a simple configuration of inserting the engagement piece into the slit (the engaged portion). With this configuration, high assembly workability can be realized although it has a configuration that can absorb the thermal expansion of the first and second reflective sheets. In addition, since the shapes of the engagement piece and the engaged portion can be simplified and have less irregularity, unevenness in the intensity distribution of reflected light by the first and second reflective sheets can be suppressed even if the engagement piece and the engaged portion are formed on the first and second reflective sheets, respectively.

(3) In accordance with a preferred embodiment according to any one of the surface light source devices mentioned above, the engagement piece includes a protruding portion that protrudes from the peripheral portion of the first reflective sheet and has a tapered distal end portion and a retaining portion that protrudes laterally relative to the protruding portion. With this configuration, the tapered protruding portion makes it easier to insert the engagement piece into the engaged portion. This effectively improves the assembly workability even when the plurality of the first and second reflective sheets are installed. In addition, after inserting the engagement piece into the engaged portion, the retaining portion that laterally protrudes can make it difficult for the engagement piece to come out of the engaged portion. Thus, the assembly workability can be improved more effectively.

(4) In accordance with a preferred embodiment according to any one of the surface light source devices mentioned above, the engaged portion is located at a position inside relative to a peripheral portion of the second reflective sheet such that the peripheral portion of the first reflective sheet overlaps the peripheral portion of the second reflective sheet when the engaged portion is engaged with the engagement piece. This configuration prevents the formation of an area that is not covered by any of the first and second reflective sheets at the boundary portion between the first reflective sheet and the second reflective sheet. With this configuration, unevenness in the intensity distribution of reflected light by the reflector can be suppressed.

(5) In accordance with a preferred embodiment according to any one of the surface light source devices mentioned above, the first reflective sheet and the second reflective sheet are each made of a resin sheet with a relatively large amount of thermal expansion in a first in-plane direction and a relatively small amount of thermal expansion in a second in-plane direction orthogonal to the first in-plane direction, the engagement piece extends from the peripheral portion of the first reflective sheet in the first in-plane direction, and the engaged portion engages with the engagement piece shiftably in the first in-plane direction. The first in-plane direction in which the amount of thermal expansion is relatively large is a machine flow direction during the manufacture of resin sheets, and is the so-called MD direction (Machine Direction). The second in-plane direction in which the amount of thermal expansion is relatively small is a width direction orthogonal to the MD direction within a surface of the resin sheet, and is the so-called TD direction (Transverse Direction). With this configuration, since the amount of expansion in the first in-plane direction, where the amount of thermal expansion is particularly large, can be absorbed by the positional shift that maintains the engaged state of the first reflective sheet and the second reflective sheet, wrinkles in the first and second reflective sheets caused by thermal expansion can be suppressed more effectively.

(6) In accordance with a preferred embodiment according to any one of the surface light source devices mentioned above, the reflector further includes a third reflective sheet adjacent to the second reflective sheet at a position opposite to the first reflective sheet in a direction along the installation surface, the second reflective sheet further has an engagement piece at a peripheral portion of the second reflective sheet on a third reflective sheet side, and the third reflective sheet has an engaged portion that is engaged with the engagement piece of the second reflective sheet. With this configuration, the direction in which the first reflective sheet is engaged with the second reflective sheet (the direction in which the engagement piece of the first reflective sheet is engaged with the engaged portion of the second reflective sheet) and the direction in which the second reflective sheet is engaged with the third reflective sheet can be aligned. Therefore, the assembly work can be done simply by engaging each reflective sheet in turn from the end portion side in the same direction. If there are more than four reflective sheets, the number of the second reflective sheet can be increased. Therefore, even when the installation surface of the holding member is dividedly covered by three or more reflective sheets, the workability of assembling each reflective sheet can be effectively improved.

(7) In accordance with a preferred embodiment according to any one of the surface light source devices mentioned above, the reflector is fixedly attached to a predetermined position of the holding member by a first adhesive member that adheres the reflector immovably in a direction along the installation surface and a second adhesive member that is disposed between the first adhesive member and a peripheral portion of the reflector and adheres the reflector shiftably in the direction along the installation surface. With this configuration, since the reflector can be adhered at multiple locations, positional shifting and tuning up of the reflector can be effectively suppressed. Furthermore, the first adhesive member fixes the reflector, whereas the second adhesive member can adhere the reflector around the first adhesive member in a shiftable manner in an in-plane direction. As a result, when thermal expansion occurs in the reflector, the reflector stretches (expands) toward the peripheral portion around the fixed position by the first adhesive member, but the second adhesive member can absorb the positional shift caused by the expansion. Thus, wrinkles in the reflector can be suppressed in an area between the first adhesive member and the second adhesive member. In other words, it is possible not only to suppress wrinkles caused by thermal expansion at the boundary portion between the first and second reflective sheets by dividing the reflector into the first and second reflective sheets, but also to suppress wrinkles in an area between the multiple adhering locations on the reflector.

(8) In view of the state of the known technology and in accordance with a second aspect of the present invention, a display device comprises any one of the surface light source devices mentioned above; and a display disposed on the light exit surface of the surface light source device to face the reflector.

In the display device according to the second aspect, as with the surface light source device according to the first aspect above, even when thermal expansion occurs in the first reflective sheet and the second reflective sheet, the amount of expansion can be absorbed by the engagement piece and the engaged portion that are shiftable relative to each other. Thus, wrinkles in the first and second reflective sheets caused by thermal expansion of the first and second reflective sheets due to temperature changes can be suppressed. Furthermore, since the engagement piece and the engaged portion can be positionally shifted while being engaged with each other, edge portions of the first and second reflective sheets can be prevented from turning up without adhering a boundary portion between the first reflective sheet and the second reflective sheet. With this configuration, since the luminance distribution of light incident on the display can be prevented from changing due to heat generation and the like, the display quality of the display device can be prevented from deteriorating due to heat generation and the like. In addition, since the first reflective sheet and the second reflective sheet can be attached to the holding member in an engaged state as a unit, the assembly workability can be improved, compared to a case where a plurality of reflective sheets are attached one by one.

(9) In view of the state of the known technology and in accordance with a third aspect of the present invention, a surface light source device comprises a plurality of light sources configured to emit light toward a light exit surface of the surface light source device; a holding member having an installation surface on which the light sources are installed; and a reflector having a plurality of openings that expose the light sources, respectively, the reflector being arranged to cover the installation surface of the holding member, the reflector being fixedly attached to a predetermined position of the holding member by a first adhesive member that adheres the reflector immovably in a direction along the installation surface and a second adhesive member that is disposed between the first adhesive member and a peripheral portion of the reflector and adheres the reflector shiftably in the direction along the installation surface.

The surface light source device according to the third aspect, as mentioned above, comprises the reflector being fixedly attached to the predetermined position of the holding member by the first adhesive member that adheres the reflector immovably in the direction along the installation surface and the second adhesive member that is disposed between the first adhesive member and the peripheral portion of the reflector and adheres the reflector shiftably in the direction along the installation surface. With this configuration, the first adhesive member positions the reflector in an in-plane direction and fixes the reflector, whereas the second adhesive member can adhere the reflector around the first adhesive member in a shiftable manner in the in-plane direction. As a result, when thermal expansion occurs in the reflector, the reflector stretches (expands) toward the peripheral portion around a fixed position by the first adhesive member, but the second adhesive member can allow the positional shift caused by the expansion toward the peripheral portion. Thus, wrinkles in the reflector can be suppressed in an area between the first adhesive member and the second adhesive member. Therefore, wrinkles in the reflector caused by thermal expansion of the reflector due to temperature changes can be suppressed. Furthermore, with the configuration above, since the second adhesive member maintains the adhered state while allowing the positional shift caused by the expansion and contraction of the reflector, an edge portion of the reflector can be prevented from turning up.

(10) In accordance with a preferred embodiment according to the surface light source device mentioned above, the first adhesive member is provided at one location within a surface of the reflector, and the second adhesive member is provided at a plurality of locations on a peripheral portion side of the reflector relative to the first adhesive member. With this configuration, when thermal expansion occurs in the reflector, the reflector extends toward the peripheral portion around one fixed location where the first adhesive member is provided. Since this expansion of the reflector can be absorbed by the second adhesive member, the second adhesive member at the plurality of locations can effectively suppress the turning up, lifting, and warping of the reflector. As a result, unevenness in the intensity distribution of reflected light by the reflector can be effectively suppressed.

(11) In accordance with a preferred embodiment according to any one of the surface light source devices mentioned above, the reflector is made of a resin sheet with a relatively large amount of thermal expansion in a first in-plane direction and a relatively small amount of thermal expansion in a second in-plane direction orthogonal to the first in-plane direction, the first adhesive member is provided at a center side of the reflector in the first in-plane direction, and the second adhesive member is provided spaced apart from the first adhesive member in the first in-plane direction. With this configuration, the reflector positionally shifts (expands) relatively large in the first in-plane direction away from the fixed position by the first adhesive member when the thermal expansion occurs, but the amount of expansion in the first in-plane direction can be absorbed by the second adhesive member. Thus, wrinkles in the reflector caused by thermal expansion can be suppressed more effectively.

(12) In accordance with a preferred embodiment according to any one of the surface light source devices mentioned above, the first adhesive member and the second adhesive member are each provided to extend linearly along the second in-plane direction and are arranged spaced apart along the first in-plane direction. With this configuration, a large adhesive area can be easily secured by the first adhesive member and the second adhesive member extending linearly in the second in-plane direction, in which the amount of thermal expansion is small, and a direction of positional shift due to thermal expansion of the reflector can be substantially limited to the first in-plane direction. Furthermore, this positional shift in the first in-plane direction can be effectively absorbed by the second adhesive member.

(13) In accordance with a preferred embodiment according to any one of the surface light source devices mentioned above, the openings of the reflector include a first opening disposed at a first distance in the first in-plane direction relative to the first adhesive member, and a second opening disposed at a second distance greater than the first distance in the first in-plane direction relative to the first adhesive member, and the second opening has a larger dimension in the first in-plane direction than the first opening. With this configuration, since the positional shift of an opening due to thermal expansion of the reflector increases as moving away from the first adhesive member that fixes the reflector in the first in-plane direction, the second opening that has a larger dimension in the first in-plane direction can avoid contact between the reflector and the light source even when the positional shift occurs. Furthermore, since the first opening that has a smaller distance from the first adhesive member also has a smaller positional shift caused by thermal expansion, the dimension in the first in-plane direction can be reduced compared to the second opening, and an area that is not covered by the reflector between an edge portion of the first opening and the light source can be minimized. As a result, unevenness in the intensity distribution of reflected light by the reflector can be prevented.

(14) In accordance with a preferred embodiment according to any one of the surface light source devices mentioned above, the first adhesive member and the second adhesive member each include at least one of adhesive tape or glue, and the second adhesive member is made of a material that has lower adhesive strength or is more easily deformed than the first adhesive member. With this configuration, while the reflector is fixed by the first adhesive member, by using an adhesive member that has lower adhesive strength or is more easily deformed than the first adhesive member as the second adhesive member, a configuration is easily realized that can prevent the reflector from turning up or lifting while allowing positional shift.

(15) In view of the state of the known technology and in accordance with a fourth aspect of the present invention, a display device comprises any one of the surface light source devices mentioned above; and a display disposed on the light exit surface of the surface light source device to face the reflector.

In the display device according to the fourth aspect, as with the surface light source device according to the third aspect above, when thermal expansion occurs in the reflector, the second adhesive member can allow the positional shift caused by the expansion toward the peripheral portion around the fixed position by the first adhesive member. Thus, wrinkles in the reflector can be suppressed in an area between the first adhesive member and the second adhesive member. Therefore, wrinkles in the reflector caused by thermal expansion of the reflector due to temperature changes can be suppressed. Furthermore, with the configuration above, since the second adhesive member maintains the adhered state while allowing the positional shift caused by the expansion and contraction of the reflector, an edge portion of the reflector can be prevented from turning up. With this configuration, since the luminance distribution of light incident on the display can be prevented from changing due to heat generation and the like, the display quality of the display device can be prevented from deteriorating due to heat generation and the like.

(16) In accordance with a preferred embodiment according to any one of the surface light source devices in accordance with the first aspect mentioned above, the first adhesive member is provided at one location within a surface of one of the first reflective sheet and the second reflective sheet, and the second adhesive member is provided at a plurality of locations on a peripheral portion side of the one of the first reflective sheet and the second reflective sheet relative to the first adhesive member.

(17) In accordance with a preferred embodiment according to any one of the surface light source devices in accordance with the first aspect mentioned above, one of the first reflective sheet and the second reflective sheet is made of a resin sheet with a relatively large amount of thermal expansion in a first in-plane direction and a relatively small amount of thermal expansion in a second in-plane direction orthogonal to the first in-plane direction, the first adhesive member is provided at a center side of the one of the first reflective sheet and the second reflective sheet in the first in-plane direction, and the second adhesive member is provided spaced apart from the first adhesive member in the first in-plane direction.

(18) In accordance with a preferred embodiment according to any one of the surface light source devices in accordance with the first aspect mentioned above, the first adhesive member and the second adhesive member are each provided to extend linearly along the second in-plane direction and are arranged spaced apart along the first in-plane direction.

(19) In accordance with a preferred embodiment according to any one of the surface light source devices in accordance with the first aspect mentioned above, the openings of the reflector include a first opening disposed at a first distance in the first in-plane direction relative to the first adhesive member on the one of the first reflective sheet and the second reflective sheet, and a second opening disposed at a second distance greater than the first distance in the first in-plane direction relative to the first adhesive member on the one of the first reflective sheet and the second reflective sheet, and the second opening has a larger dimension in the first in-plane direction than the first opening.

(20) In accordance with a preferred embodiment according to any one of the surface light source devices in accordance with the first aspect mentioned above, the first adhesive member and the second adhesive member each include at least one of adhesive tape or glue, and the second adhesive member is made of a material that has lower adhesive strength or is more easily deformed than the first adhesive member.

According to the present invention, as described above, wrinkles in a reflective sheet caused by thermal expansion of the reflective sheet due to temperature changes can be suppressed.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a backlight unit or a liquid crystal display device in an upright position. Accordingly, these directional terms, as utilized to describe the backlight unit or the liquid crystal display device should be interpreted relative to a backlight unit or the liquid crystal display device in an upright position.

Also it will be understood that although the terms "first" and "second" may be used herein to describe various components these components should not be limited by these terms. These terms are only used to distinguish one component from another. Thus, for example, a first component discussed above could be termed a second component and vice-a-versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A surface light source device comprising:
a plurality of light sources configured to emit light toward a light exit surface of the surface light source device;
a holding member having an installation surface on which the light sources are installed; and
a reflector having a plurality of openings that expose the light sources, respectively, the reflector being arranged to cover the installation surface of the holding member,
the reflector including a first reflective sheet having an engagement piece at a peripheral portion of the first reflective sheet and a second reflective sheet adjacent to the first reflective sheet and having an engaged portion that is shiftably engaged with the engagement piece, and
the openings of the reflector including at least one opening disposed on the first reflective sheet and at least one opening disposed on the second reflective sheet.

2. The surface light source device according to claim 1, wherein
the engagement piece protrudes outward from the peripheral portion of the first reflective sheet, and the engaged portion includes a slit that is provided on the second reflective sheet and into which the engagement piece is inserted.

3. A surface light source device comprising:
a plurality of light sources configured to emit light toward a light exit surface of the surface light source device;
a holding member having an installation surface on which the light sources are installed; and
a reflector having a plurality of openings that expose the light sources, respectively, the reflector being arranged to cover the installation surface of the holding member,
the reflector including a first reflective sheet having an engagement piece at a peripheral portion of the first reflective sheet and a second reflective sheet adjacent to the first reflective sheet and having an engaged portion that is shiftably engaged with the engagement piece,
the engagement piece protruding outward from the peripheral portion of the first reflective sheet,
the engaged portion including a slit that is provided on the second reflective sheet and into which the engagement piece is inserted, and
the engagement piece including a protruding portion that protrudes from the peripheral portion of the first reflective sheet and has a tapered distal end portion and a retaining portion that protrudes laterally relative to the protruding portion.

4. The surface light source device according to claim 1, wherein
the engaged portion is located at a position inside relative to a peripheral portion of the second reflective sheet such that the peripheral portion of the first reflective sheet overlaps the peripheral portion of the second reflective sheet when the engaged portion is engaged with the engagement piece.

5. A surface light source device comprising:
a plurality of light sources configured to emit light toward a light exit surface of the surface light source device;
a holding member having an installation surface on which the light sources are installed; and
a reflector having a plurality of openings that expose the light sources, respectively, the reflector being arranged to cover the installation surface of the holding member,
the reflector including a first reflective sheet having an engagement piece at a peripheral portion of the first reflective sheet and a second reflective sheet adjacent to the first reflective sheet and having an engaged portion that is shiftably engaged with the engagement piece,
the first reflective sheet and the second reflective sheet being each made of a resin sheet with a relatively large amount of thermal expansion in a first in-plane direction and a relatively small amount of thermal expansion in a second in-plane direction orthogonal to the first in-plane direction,
the engagement piece extending from the peripheral portion of the first reflective sheet in the first in-plane direction, and
the engaged portion engaging with the engagement piece shiftably in the first in-plane direction.

6. The surface light source device according to claim 1, wherein
the reflector further includes a third reflective sheet adjacent to the second reflective sheet at a position opposite to the first reflective sheet in a direction along the installation surface,
the second reflective sheet further has an engagement piece at a peripheral portion of the second reflective sheet on a third reflective sheet side, and the third reflective sheet has an engaged portion that is engaged with the engagement piece of the second reflective sheet.

7. A surface light source device comprising:
a plurality of light sources configured to emit light toward a light exit surface of the surface light source device;
a holding member having an installation surface on which the light sources are installed; and
a reflector having a plurality of openings that expose the light sources, respectively, the reflector being arranged to cover the installation surface of the holding member,
the reflector including a first reflective sheet having an engagement piece at a peripheral portion of the first reflective sheet and a second reflective sheet adjacent to the first reflective sheet and having an engaged portion that is shiftably engaged with the engagement piece,
the reflector being fixedly attached to a predetermined position of the holding member by a first adhesive member that adheres the reflector immovably in a direction along the installation surface and a second adhesive member that is disposed between the first adhesive member and a peripheral portion of the reflector and adheres the reflector shiftably in the direction along the installation surface.

8. A display device comprising:
the surface light source device according to claim 1; and
a display disposed on the light exit surface of the surface light source device to face the reflector.

9. A surface light source device comprising:
a plurality of light sources configured to emit light toward a light exit surface of the surface light source device;
a holding member having an installation surface on which the light sources are installed; and
a reflector having a plurality of openings that expose the light sources, respectively, the reflector being arranged to cover the installation surface of the holding member,
the reflector being fixedly attached to a predetermined position of the holding member by a first adhesive member that adheres the reflector immovably in a direction along the installation surface and a second adhesive member that is disposed between the first adhesive member and a peripheral portion of the reflector and adheres the reflector shiftably in the direction along the installation surface.

10. The surface light source device according to claim 9, wherein
the first adhesive member is provided at one location within a surface of the reflector, and
the second adhesive member is provided at a plurality of locations on a peripheral portion side of the reflector relative to the first adhesive member.

11. The surface light source device according to claim 9, wherein
the reflector is made of a resin sheet with a relatively large amount of thermal expansion in a first in-plane direction and a relatively small amount of thermal expansion in a second in-plane direction orthogonal to the first in-plane direction,
the first adhesive member is provided at a center side of the reflector in the first in-plane direction, and
the second adhesive member is provided spaced apart from the first adhesive member in the first in-plane direction.

12. The surface light source device according to claim 11, wherein
the first adhesive member and the second adhesive member are each provided to extend linearly along the second in-plane direction and are arranged spaced apart along the first in-plane direction.

13. The surface light source device according to claim 11, wherein
the openings of the reflector include a first opening disposed at a first distance in the first in-plane direction relative to the first adhesive member, and a second opening disposed at a second distance greater than the first distance in the first in-plane direction relative to the first adhesive member, and
the second opening has a larger dimension in the first in-plane direction than the first opening.

14. The surface light source device according to claim 9, wherein
the first adhesive member and the second adhesive member each include at least one of adhesive tape or glue, and
the second adhesive member is made of a material that has lower adhesive strength or is more easily deformed than the first adhesive member.

15. A display device comprising:
the surface light source device according to claim 9; and
a display disposed on the light exit surface of the surface light source device to face the reflector.

16. The surface light source device according to claim 7, wherein
the first adhesive member is provided at one location within a surface of one of the first reflective sheet and the second reflective sheet, and
the second adhesive member is provided at a plurality of locations on a peripheral portion side of the one of the first reflective sheet and the second reflective sheet relative to the first adhesive member.

17. The surface light source device according to claim 7, wherein
one of the first reflective sheet and the second reflective sheet is made of a resin sheet with a relatively large amount of thermal expansion in a first in-plane direction and a relatively small amount of thermal expansion in a second in-plane direction orthogonal to the first in-plane direction,
the first adhesive member is provided at a center side of the one of the first reflective sheet and the second reflective sheet in the first in-plane direction, and
the second adhesive member is provided spaced apart from the first adhesive member in the first in-plane direction.

18. The surface light source device according to claim 17, wherein
the first adhesive member and the second adhesive member are each provided to extend linearly along the second in-plane direction and are arranged spaced apart along the first in-plane direction.

19. The surface light source device according to claim 17, wherein
the openings of the reflector include a first opening disposed at a first distance in the first in-plane direction relative to the first adhesive member on the one of the first reflective sheet and the second reflective sheet, and a second opening disposed at a second distance greater than the first distance in the first in-plane direction relative to the first adhesive member on the one of the first reflective sheet and the second reflective sheet, and
the second opening has a larger dimension in the first in-plane direction than the first opening.

20. The surface light source device according to claim 7, wherein
the first adhesive member and the second adhesive member each include at least one of adhesive tape or glue, and
the second adhesive member is made of a material that has lower adhesive strength or is more easily deformed than the first adhesive member.

* * * * *